(12) United States Patent
Hartland et al.

(10) Patent No.: US 8,244,678 B1
(45) Date of Patent: Aug. 14, 2012

(54) METHOD AND APPARATUS FOR MANAGING BACKUP DATA

(75) Inventors: Hayden Thomas Hartland, Draper, UT (US); Dale Woodroffe Goddard, Salt Lake, UT (US); David Loy Jensen, West Jordan, UT (US)

(73) Assignee: Spearstone Management, LLC, Lindon, UT (US)

( * ) Notice: Subject to any disclaimer, the term of this patent is extended or adjusted under 35 U.S.C. 154(b) by 489 days.

(21) Appl. No.: 12/408,617

(22) Filed: Mar. 20, 2009

Related U.S. Application Data

(60) Provisional application No. 61/092,111, filed on Aug. 27, 2008.

(51) Int. Cl.
*G06F 17/00* (2006.01)
(52) U.S. Cl. ........ 707/640; 707/610; 707/661; 707/694; 711/162; 726/26
(58) Field of Classification Search .................. 707/610, 707/640, 661, 688, 694, 821, 999.2; 711/162; 711/170; 726/26
See application file for complete search history.

(56) References Cited

U.S. PATENT DOCUMENTS

| | | | | |
|---|---|---|---|---|
| 7,509,687 | B2 * | 3/2009 | Ofek et al. | 726/30 |
| 2005/0246398 | A1 * | 11/2005 | Barzilai et al. | 707/204 |
| 2006/0123250 | A1 * | 6/2006 | Maheshwari et al. | 713/193 |
| 2008/0177970 | A1 * | 7/2008 | Prahlad et al. | 711/170 |
| 2008/0177971 | A1 * | 7/2008 | Prahlad et al. | 711/170 |
| 2010/0095077 | A1 * | 4/2010 | Lockwood | 711/162 |
| 2010/0275032 | A1 * | 10/2010 | Bhangi | 713/182 |

* cited by examiner

*Primary Examiner* — Dennis Truong
(74) *Attorney, Agent, or Firm* — ColterJennings

(57) ABSTRACT

A method of easily-accessible, versioned, secure, redundant backup of digital information involves establishing a back-end data store connected to a world-wide telecommunications network. Users communicate with the data store using a variety of user a computing devices, each of which has installed thereon client software capable various operations, including communicating with the data store, monitoring a second data store, detecting and replicating changes in the second data store, and selecting data to be transmitted over the telecommunications network to and from the back-end data store. Users may establish policies for data backup and transmission, may monitor the status of data backup, may browsing the back-end data store, may review prior versions of data stored on the back-end data store. The data store is configured for remote management by a user, including deletion of data in the second data store if the computing device is lost or stolen.

42 Claims, 25 Drawing Sheets

FIGURE 21

ACCOUNT SETTINGS

As administrator, you may enable additional DiskAgent users.

* Users have their own login credentials and can access only their own backups.
* Administrators can access all users' backups.
* Charges for all users you create appear on your monthly invoice.

| Name | Email (Username) | Loss Protection | Status | Actions |
|---|---|---|---|---|
| Hunter Hartford * | hunter.hartford@spectorsoft.com | protectable | enabled | Edit Delete |
| | jh@h.com | protectable | enabled | Edit Delete |
| User Upon * | user@h.com | protectable | enabled | Edit |

* Administrators

[Add User] — 138

134

* Loss Protection – Enables you to remotely delete protected information from the computer and invoke tracking features to help recover it in the event it is lost or stolen.
* Status – <u>Enabled</u> users can perform and access their DiskAgent backups. <u>Disabled</u> withdraws the user's ability to perform or access DiskAgent backups, but retains the stored backups for administrator access.
* Delete – Removes the user and his or her stored backups.
* Add User – Creates a new user account and emails the user a link to establish their account password.

METHOD AND APPARATUS FOR MANAGING BACKUP DATA

CROSS-REFERENCE TO RELATED APPLICATION

This application claims priority based on U.S. Provisional Patent Application Ser. No. 61/092,111 filed Aug. 27, 2008 and titled "Method for Data and Device Protection and Recovery," the disclosure of which is incorporated herein by this reference.

BACKGROUND

This application relates generally to a method for protecting, recovering and deleting digital data, and in particular to a method of providing easily-accessible, versioned, secure, redundant backup of digital information using a customizable system to access, control, delete and otherwise manage digital data across a variety of digital data platforms.

The advent of digital storage has been a boon to numerous fields of endeavor. The ability to quickly generate, store, and replicate digital data has permitted users significant freedom and flexibility in maintaining information. However, with these new-found abilities has come certain risks and difficulties.

For example, users often store various digital files on different computers and in different folders on any given computer. This often creates a situation where the user is unable to locate a digital file, because it is stored on a different computer or storage device, or in a different file folder. Also, if the file has been modified, the user may have difficulty with version control, that is, with knowing which is the most recent version, and which is an earlier version.

Users also desire secure access to their various digital files. Data stored on a computer may be lost or stolen along with the computer. However, lack of redundant, secure data storage is only part of the problem. Users have also needed the ability to digitally destroy files on the lost or stolen computer. This may also be a potential issue with other digital devices, such as cell phones and PDAs and mp3 players.

In other prior systems, a user was permitted to make certain dynamic changes to protected content while offline. However, such a system was typically designed for scheduled backups or would only capture and back up changes that occur while online at a scheduled time. Therefore, developing a relatively comprehensive data storage system having flexibility of design and use would be advantageous. Prior systems also did not typically enable cell phones and PDAs and other such devices.

SUMMARY

The present method relates to a data storage, recovery and management system that provides easily-accessible, versioned, secure, redundant backup of digital information. The method permits the user to design specific, flexible storage and recovery options, and even includes remote, non-possessory deletion of data in certain circumstances. The present method therefore is useful to mitigate two common risks of data storage, the risk of loss due to failure of hardware and the risk of loss due to theft or loss of the data store.

The method uses a software client installed on one or more of the devices holding the data store to be protected. The software client communicates with a server that facilitates connection between the client and data storage facilities using standard telecommunication protocols, such as the Internet. Data storage facilities include typical centralized data storage facilities to which user data is backed up. The user accesses the data storage through the server, typically by logging in to secure web pages via the Internet, and typically without using the client.

In one embodiment, the client software communicates with the central data storage facilities, and compares the prior files version with the most recent file version and computes a delta between the two versions for compression, encryption and upload to the second data store. The client detects and replicates changes in the respective data stores, including detection of differences in versions of data. The user may direct the client to transmit specified local data over a telecommunications network to the central data store, or to transmit data in the central data store to be transmitted over the telecommunications network to the local data store, including pushing data from one data store to the other data store using a remote access protocol (such as by using a browser). The user may establish policies for the data backup and transmission, including requirements for data to be transmitted to and from the respective data stores, data that is not to be transmitted to or from one or the other data stores, and at what point data is to be deleted from one or the other data store. Data deletion criteria may be time-based, non-access based, data type, corporate document retention guidelines, and may also include a dead-man's deletion option.

The client software may also monitor the status of data backup and provide a risk assessment based on predetermined criteria. The client may permit a user to browse the central data store, to restore data from the central data store to the local data store, to review prior versions of data stored on the central data store based on a predetermined criteria (such as time or version number), and to configure aspects of the central data store. The user may manage rights and access to the central data store and the local data store and cause data on the computing device to be deleted upon occurrence of a triggering event, such as a request from a user or an administrator, or upon the failure to authenticate to the client application when an operating system user or password has changed since the last time the client application ran. The client software may also be remotely updated.

Using the present method, the client software may provide third party applications to the computing device. The user may set backup criteria, including location, naming conventions, file types, frequently changing files backup criteria, size limits, bandwidth requirements and other such limitations. The user may set restoration criteria, including restoration of all files, specified files, data versioned file or other such criteria.

The client of the present method enables capture of electronic messages and attachments for transmission to and storage in the central data store. The client software handles alerts that identify weaknesses in the backup of data to the central data store. The client may be set to stage changes to data in the local data store during offline use for backup to the central data store upon connection to the telecommunications network, and may enable web access to the central data store based on a user name and password.

The present method includes an engine that permits rebranding of the client software. Re-branding will allow third party value added resellers to distribute the client software under a brand controlled by the third party. Thus, the method allows individual companies to run their own system, without appearing to have purchased third party software or systems. The present method allows an administrator to define different user classes, and to restrict specific user classes to differing combinations of capabilities. Hence, a reseller might issue accounts to use the method. A managed IT group may issue accounts, including accounts that permit additional administration rights.

The present method allows a user to safeguard digital information by triggering a deletion of said data, or disabling the hard drive of the computer, in certain, user-defined circumstances. For instance, the user may elect for the client software to initiate a data deletion process on the local data store whenever an operating system user or password has changed since the last time the client software ran. Once this data deletion process is initiated only proper user authentication to the Client Application by entering pre-specified user credentials can prevent data deletion. The method also includes the ability to remotely invoke data deletion on the local data store, if the associated device is sent a signal a user can initiate from a web application. The present method has also been developed to include monitoring of cell phone usage, including remote monitoring of the cell phone usage of teenagers by parents. As a result, the present method has numerous advantages over prior data storage and backup methods.

BRIEF DESCRIPTION OF THE DRAWINGS

Other features and advantages of the present method will be apparent from the following Detailed Description taken in conjunction with the accompanying Drawings, in which:

Figure 21:
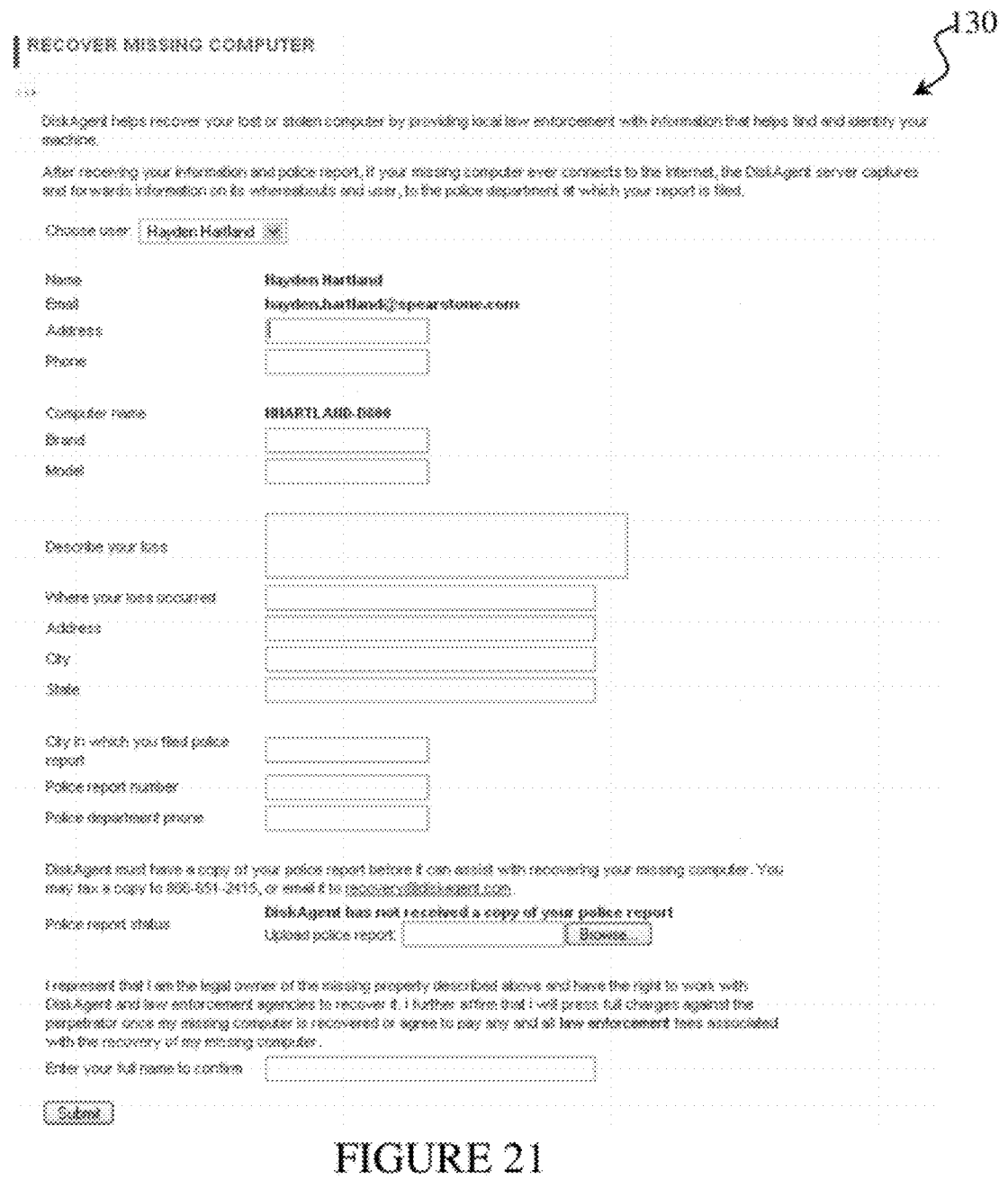

FIG. 21 depicts an exemplary recover missing computer page according to one embodiment of the present method;

FIG. 22 depicts an account settings page according to one embodiment of the present method;

FIG. 24 depicts an exemplary activity report page according to one embodiment of the present method;

FIG. 25 depicts an exemplary detailed activity page according to one embodiment of the present method;

DETAILED DESCRIPTION

Figure 1:
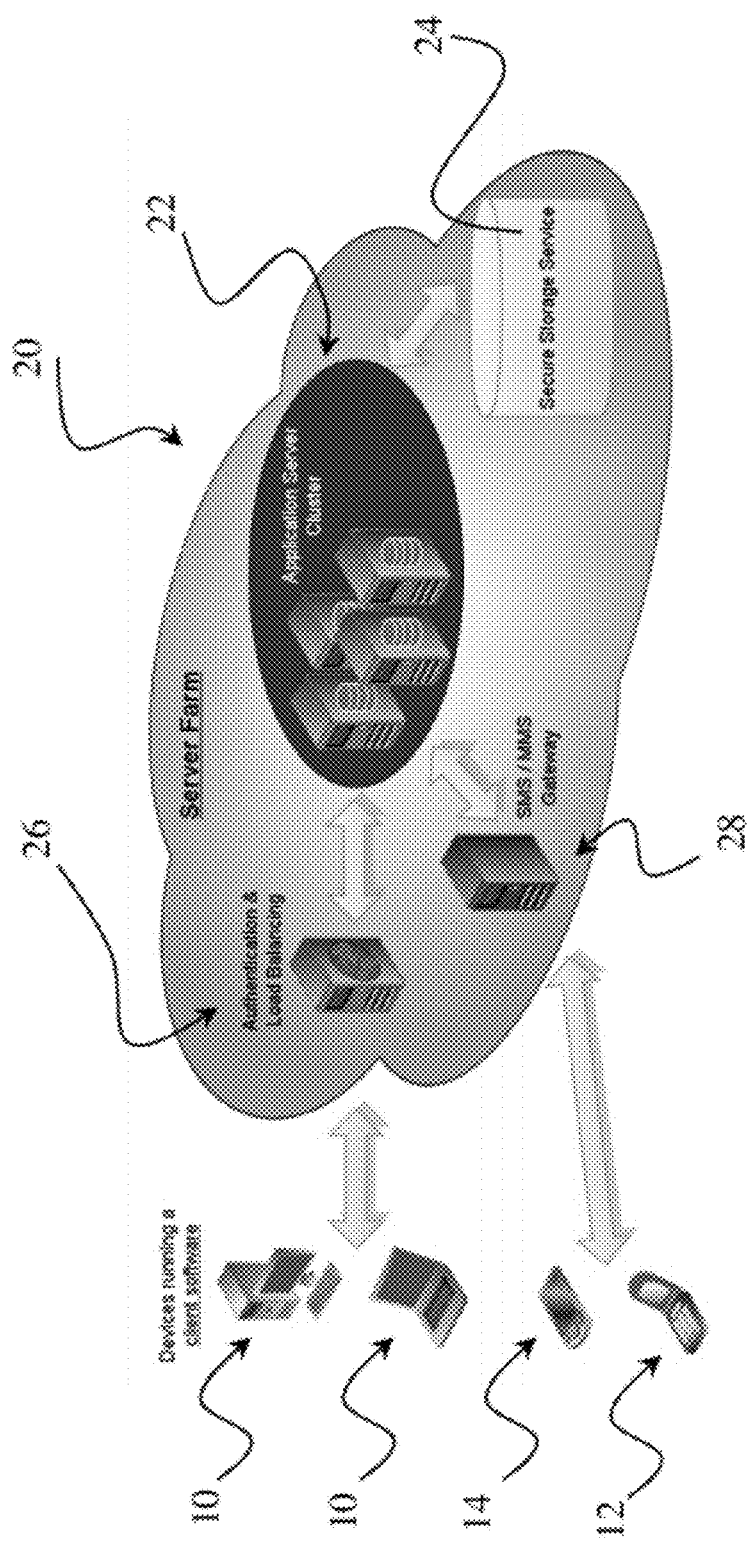
FIG. 1 depicts a schematic overview of the physical elements of an exemplary environment in which an embodiment of the present method may be deployed.

The present method provides a system for easily-accessible, versioned, secure, redundant backup of digital data, such as computer files. As depicted in FIG. 1, in the present computing environment, a user may have numerous digital devices such as multiple computers 10, cell phones 12, personal digital assistants ("PDAs") 14, portable storage drives, and other such devices. The user may be one of several entities, from a single, ordinary person to the information technologies department of a large organization. Users store data of all sorts and formats on these devices, including sensitive personal and business information. Thus, maintaining the integrity, recoverability and confidentiality of the data is often very important.

As depicted in FIG. 1, data flow in a typical user environment involves creation of digital data as well as uploading the data to a device, backing up data, encrypting data, and compressing data before transfer. Each of the devices typically has a local data store containing various usable data types for these purposes. By regularly backing up data to different data stores, the user increases the security of the data from a failure of a data store, such as by corruption or drive failure.

As also depicted in FIG. 1, modern telecommunications permit a user to back data up from each of the local data stores (the computer 10, cell phone 12, PDA 14, etc.) to a centralized, back-end data store such as a server farm 20. These back-end data stores are typically fault tolerant, multiple redundant data stores such as hard disc "farms" connected to the Internet. A user obtains access to a specified storage amount, often by paying a recurring fee, and is granted the right to store a specified amount of data on the back end data store.

Various architectures may be used, as is known in the art. According to the embodiment depicted in FIG. 1, the server farm 20 includes an application server cluster 22 connected to a secure storage facility 24. The server farm may include an authentication and load balancing front end 26 as well as a SMS/MMS gateway 28. Thus, the user communicates with the server farm through the front end 26 and the gateway 28, and thereby obtains access to the application server cluster 22 and the secure storage facility 24.

According to one embodiment of the present method, the user installs the client software on one or more of the user's digital devices, such as on a computer 10. Installation is typically performed as is known in the art, with a series of dialogue boxes to accept any software licenses required, indicate where on the computer hard drive to install the software, what shortcuts to include, and other such options. The user is then prompted to configure the client. In the case of installing on mobile phones and PDAs, the user receives a text message with a self extracting executable that installs and registers the software automatically.

Often, configuration is one of the most important aspects of the use of the present method, because the next time the user interacts with the client may be in a disaster or theft recovery situation of some sort. Configuration may include numerous decisions, such as the file types and folder locations to be backed up, determining whether the backup is to be continuous or scheduled, allocating the level of CPU and bandwidth the client software may consume, identifying the type and defining the parameters for backing up frequently changing file types, setting alert sensitivity for internet unavailability, and specifying the number and length of time the client and back end service are to retain version history for backed up files. According to this embodiment, once the client is properly configured, the client software and server software operate in the background to execute the backup and security operation as configured by the user. In the case of mobile phones and PDAs the user does not configure the client—the client automatically backs up contact information from the phone and activates a listener waiting for instructions to execute.

Figure 2:
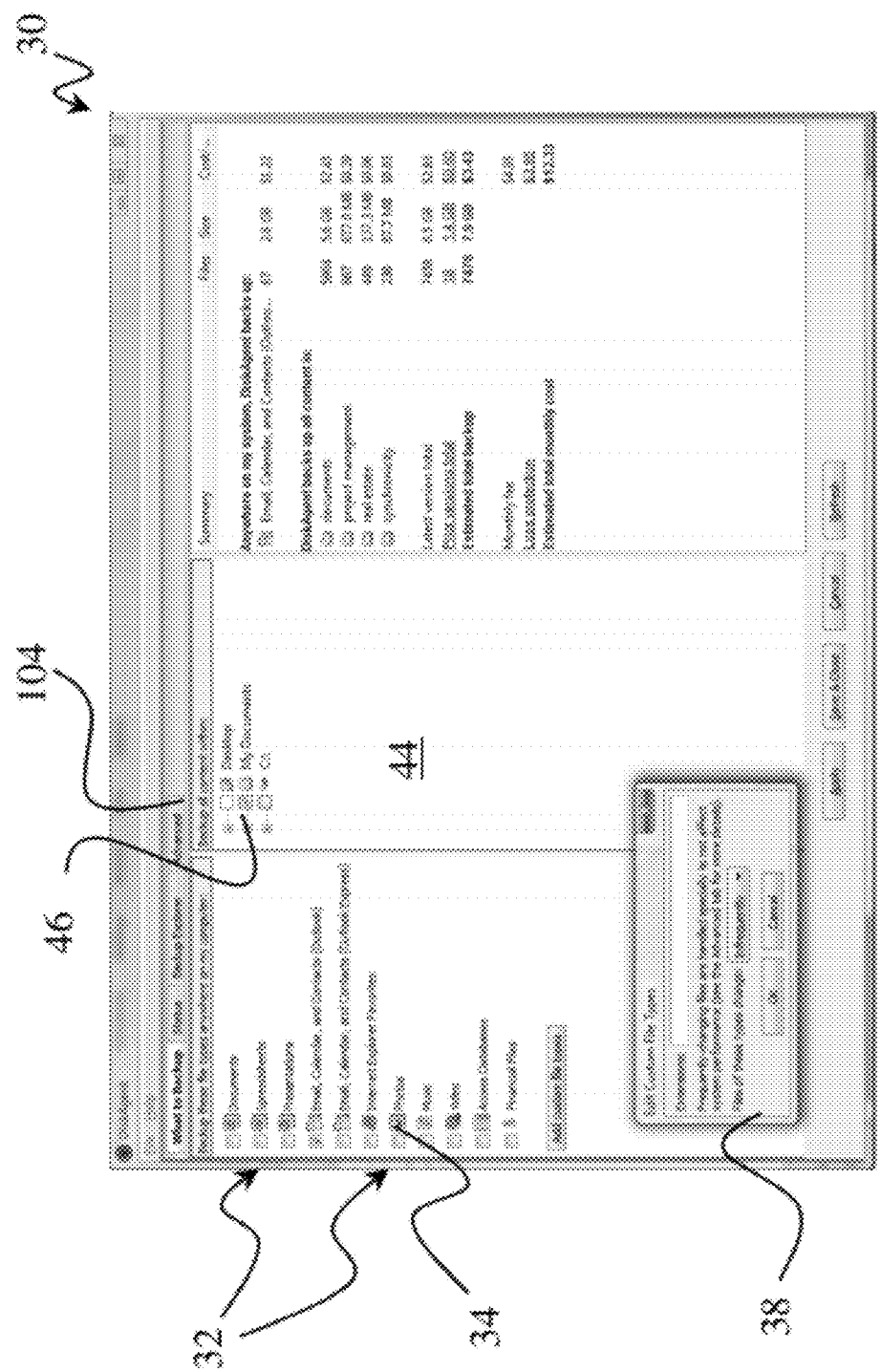
FIG. 2 depicts a configuration dialog box editing window according to one embodiment of the present method.

As an example, and referring to FIG. 2, according to one embodiment of the method, a user working on the computer 10 (or other digital device, such as a laptop 10) opens the client software, displaying an application main user interface 30, with a list 32 of file types on the left. The user selects the file types to be backed up by entering a check mark in the box 34 to the left of each selected file type. This produces an easy and convenient way to ensure that all files on the computer 10 of that type are backed up, though with the possible downside that non-critical files of the type may be backed up, thereby perhaps increasing the costs of storage, if that is how the user is paying for storage. Reasons for configuring backup by file type include situations where several users work on the same computer, the user knows there are important files of the selected type in various folders on the computer, and the user does not know where the computer stores certain file types, such as when using practice management systems, e-mail programs, accounting software or imaging software.

Figure 18:
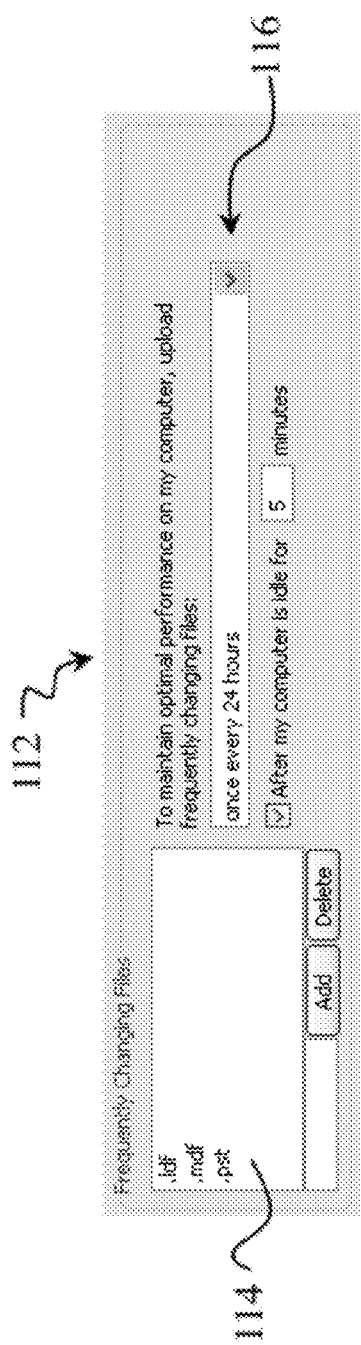
FIG. 18 depicts a frequently changing files dialog box according to one embodiment of the present method.

As depicted in FIG. 2, the client software may be designed to suggest specific file types, such as documents, spreadsheets, or video. In some circumstances, the user may need to add additional file types, using a custom file type box 38 to input the custom file extensions. In one embodiment, file types may be marked in a frequently changing files as depicted in FIG. 18 to ensure better system performance. In this embodiment, files marked as frequently changing file types are updated more frequently than file types not so marked.

Often, a user will want to backup the entire contents in a given folder or folders, no matter what file type. As depicted in FIG. 2, in those circumstances the user navigates an explorer pane 44 to each directory or folder to be completely backed up and places a check mark in the box 46 associated with the directory. The client may select each subdirectory within the designated directory to ensure that every file and file change that occurs within that directory or subdirectory is saved as a version to the back end data store 20.

The client software may also be used to generate a full disk image of the computer 10. The disk image may then be uploaded to the server farm 20. Successive disk images may then be delta differenced and the deltas uploaded to the server farm. Disk images typically are stored as .iso files and retained according to the version retention settings set in the client software.

Some digital applications use multiple files to represent a single body of data (such as a database, where information is stored in a combination of data files and transaction logs). All of these files must be copied at the same point in time to capture the data in a consistent and restorable state. The client software allows for the specification of data file groups that identify related files that must be backed up together as of a single snapshot point in time. To backup a file group, the client software first requests that any applications that are currently modifying the files in the file group enter a period of quiescence. During this interval, applications should not modify any files that belong to the file group. Then, the client software copies the group of files to a temporary staging location, using known technology that reads the files even though they are in use by other applications. After the copy process is completed, the client software notifies other applications that the period of quiescence is now over, and applications may resume modifying the files in the group.

If version changes are made when the user is not connected to the back end data store (for instance, when the computer is not connected to the Internet) the client will stage file changes in a specified directory. Once the user is back online, with the client software running, the client software will upload any staged changes that occurred while offline. A user can configure the client to use 5, 10, 15, 25, 50, or 75% (or more) of available disk space. If the user is offline long enough such that the specified folder storing staged file changes exceeds the user defined limit, the client software stops caching files and issues a warning that no more file changes may be staged while offline, or, in another configuration, follows a first in first out rule. If any given file or file change is larger than the total available space, that file change is skipped and a warning issued. If the file is new or has never been backed up, the file is placed in a client software queue, not in the staging or cache, to be backed once the computer is back online. The cache typically contains deltas or new files plus changes made while offline. In doing so, the client software encrypts, compresses and transmits the files in the selected directories to the server and also maintains a revision history of those files on the server.

To provide additional assurances that a backup will adhere to a specified policy that reflects an organization's file retention requirements, the present method may be configured to require two parties to approve any actions that involve setting or changing policy, or manually deleting data from the backup in a manner inconsistent with that backup's file retention policy. Typically, policy changes and deletions of backup data can only be initiated by a user with the "Administrator" role. To require two party authorization, an organization assigns a second user an "Approver" role. If any "Approver" role exists within an organization, actions by any Administrator that establish or alter the backup policy, or manually delete data from the backup are not performed immediately upon the Administrator's request, but instead generate a notification to the Approver signaling the need for approval before the actions are performed. When the Approver next logs in to the system, descriptions of the requested actions are presented and the approver can choose to approve or reject those action requests. Approved actions are executed by the system. Rejected actions are not performed.

The present method may also be configured to incorporate private key management. The client software allows security sensitive users to retain a private encryption/decryption key, thereby ensuring that they and only they can decode the backed up files. The private key is generated using one of the encryption methods known in the art.

The client software gives a user logging on for the first time the option of generating a private key. If the user selects that option, a private key is generated and used to encrypt (and decrypt) the user's files. The private key may be a user-selected key, or a randomly generated key. When a private key is in use, when the user accesses files from the server farm, the client software looks for the private key in a specified location, such as C:\ProgramFiles\ClientSoftware\Private Key. If the key is not found, the client software prompts the user to import the private key using a dialog box. Typically, management of the key is the user's responsibility, and thus if the user loses the key, the ability to decrypt files is also lost.

According to one embodiment, the client software establishes and uploads a base file version of a given file from which it creates and uploads successive versions. Each new version is created by calculating the differences (delta) from the base version to the current version, thereby facilitating a restore to any version by combining the base version and the delta selected for restoration or presentation. In the event that the calculated delta is greater than a predefined percentage of the base file version size, the client software establishes a new base file version to use in calculating and uploading new file delta versions.

According to another embodiment, for each file to be backed up from the local data stores (the computer 10, cell phone 12, PDA 14, etc.) to the server farm 20, the client software generates a file hash that is first sent to the server farm. The system searches the server farm for a match of the received file hash to file hashes for files it already stores. If a match is found, the source file is already stored in the server farm. Therefore, the system saves a file pointer reference in the backup for any data store that subsequently attempts to save the same file.

Figure 3:
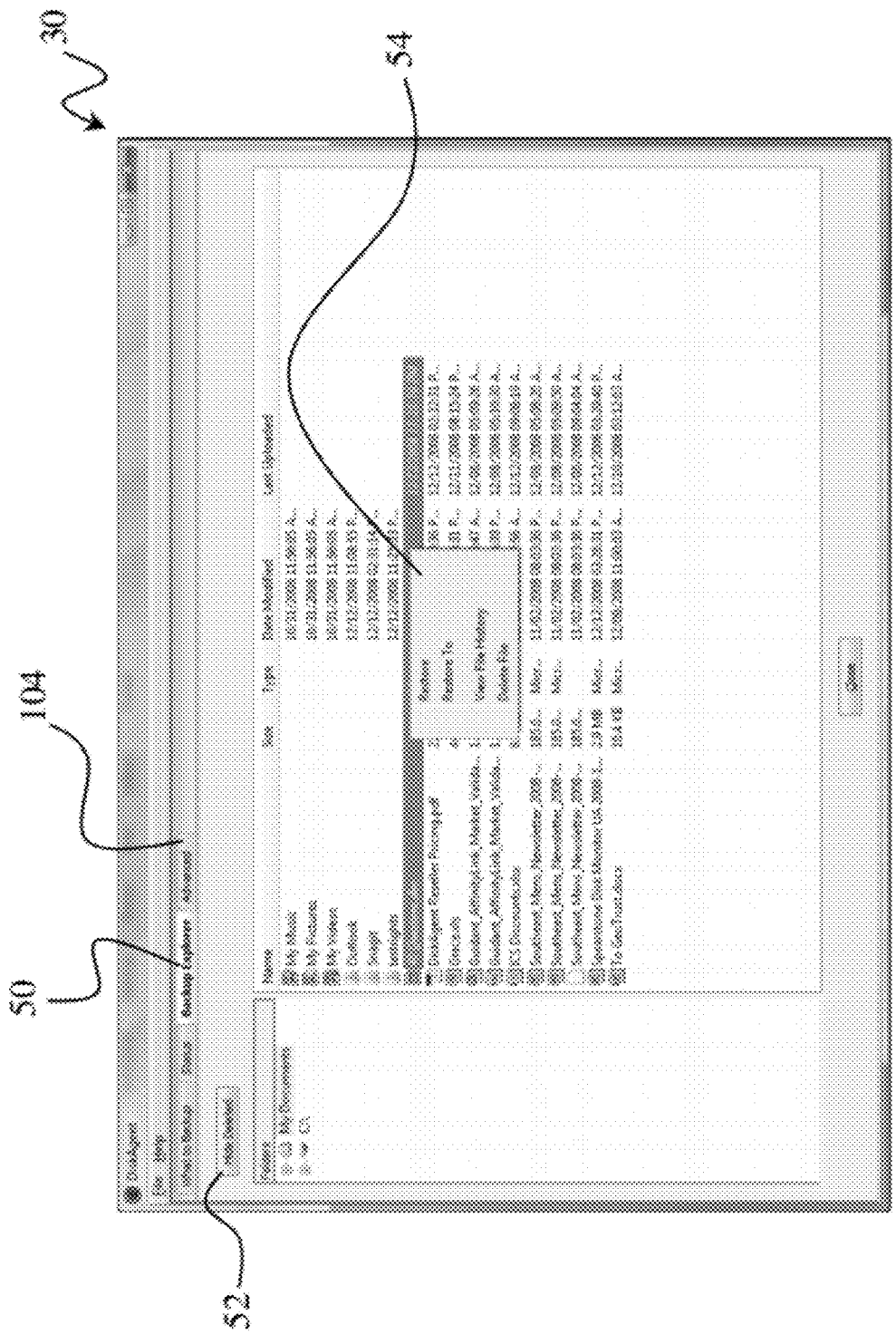
FIG. 3 depicts a backup explorer pane window according to one embodiment of the present method.

As depicted in FIG. 3, to restore deleted files to the computer 10, the user clicks on the backup explorer pane 50 of application main user interface box 30 and then clicks on a show/hide deleted toggle box 52. In this embodiment, deleted files are shown italicized in gray. The user navigates to, and right-clicks on, the deleted file, revealing a restore dialog box 54 from which the user has the option of restoring the file, restoring the file to a different location, viewing the file history or permanently deleting the file. In this embodiment, once the file is restored the client activates a popup notification in the lower right hand corner of the computer screen that indicates that the file is being restored into the file's original location.

Figure 4:
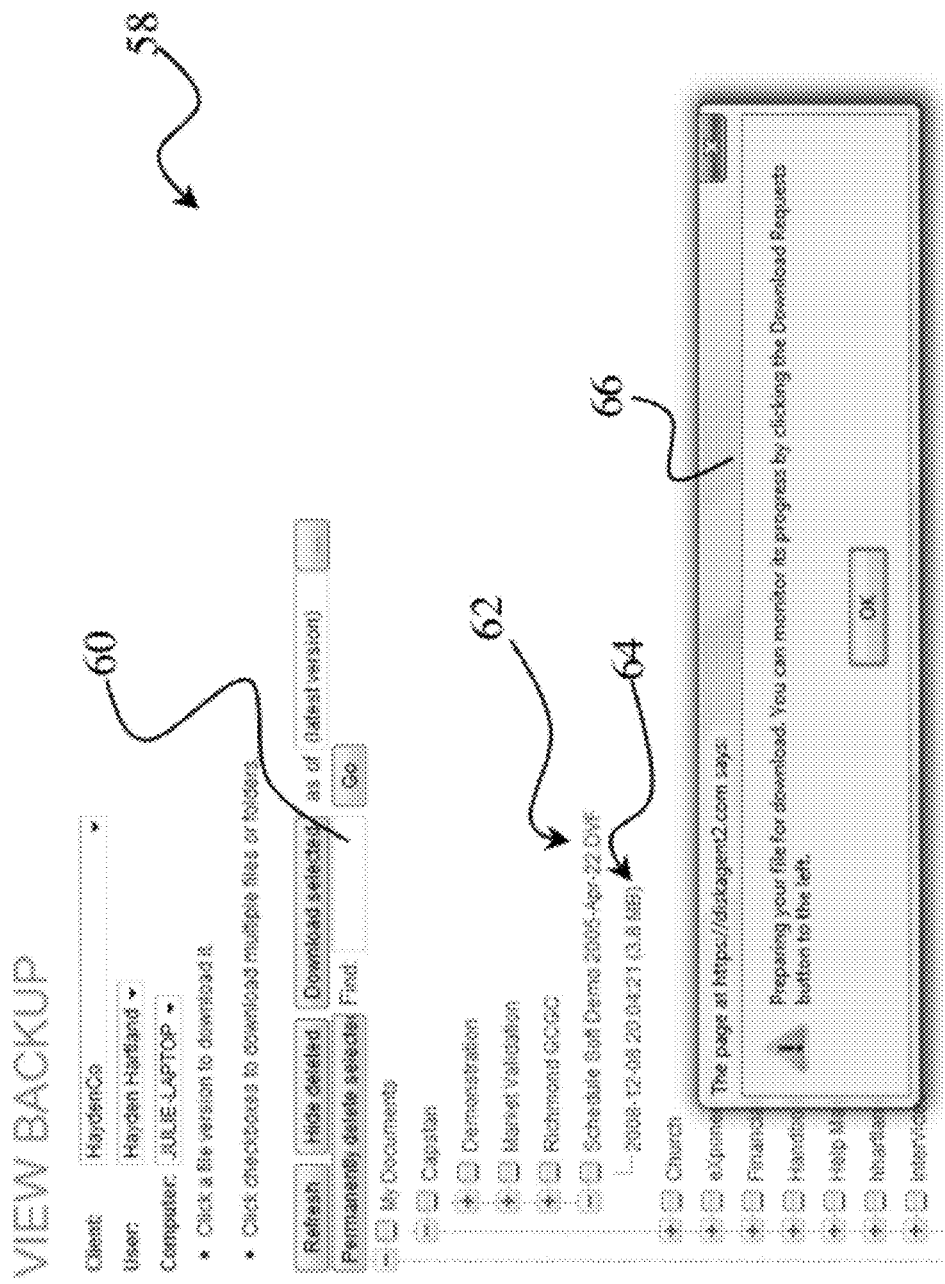
FIG. 4 depicts a view backup window according to one embodiment of the present method.

Alternatively, a file, set of files, or set of directories may be restored from a web browser. As depicted in FIG. 4, the user logs on to a website and opens a view backup screen 58. The user navigates to the file location (or enters the file name in a search field box 60), and clicks next to the file name 62. The server software displays all the file versions 64 available. The user selects the desired file version to restore. A dialog box 66 opens, detailing where the file is staged for download.

Figure 5:
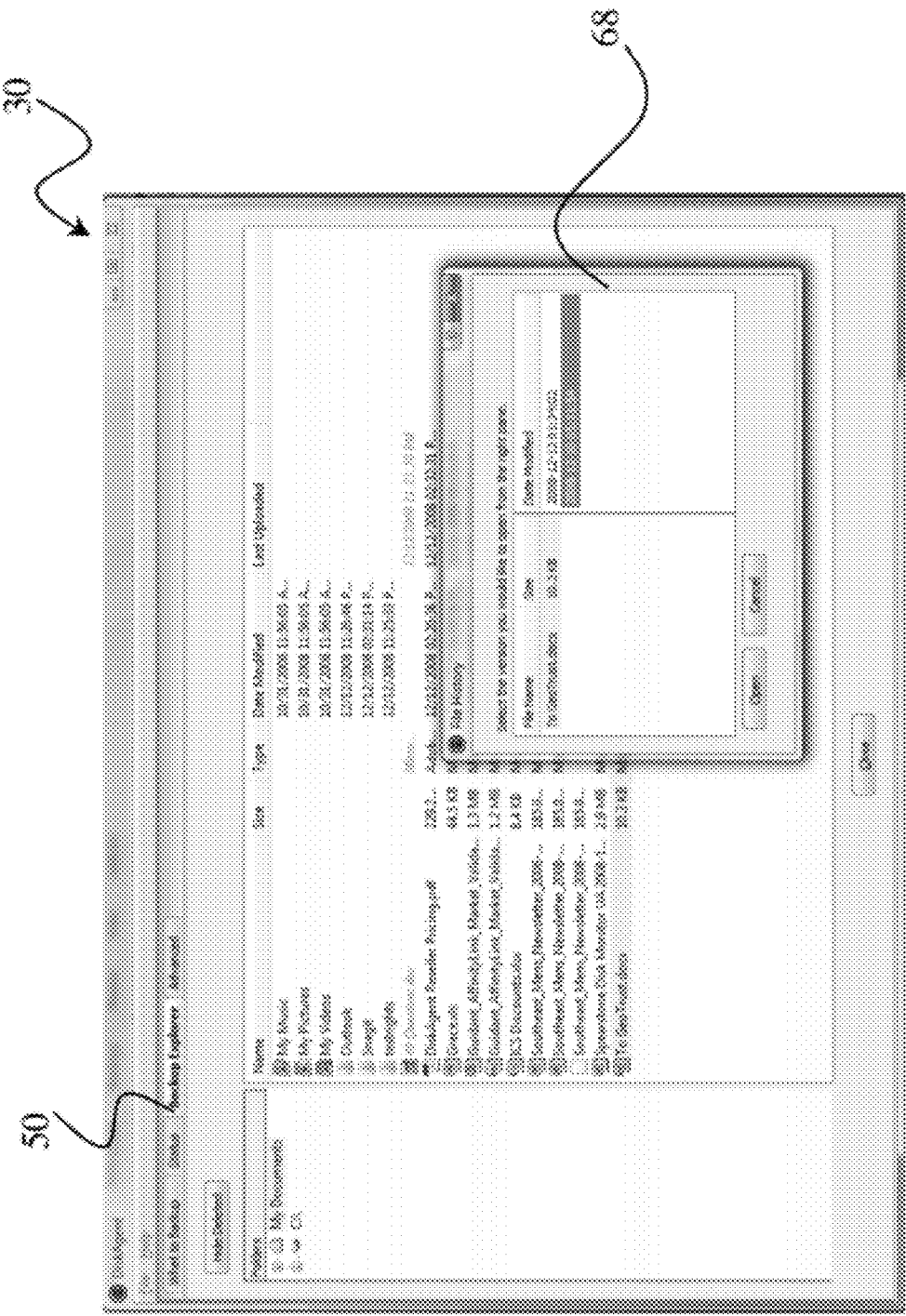
FIG. 5 depicts a second view of the backup explorer pane window of FIG. 3.

As depicted in FIG. 5, to restore a particular version of a file, the user right clicks the file name within the backup explorer pane 50 and selects view file history. The file version data and time appear in a file history dialog box. The user selects the desired version, and the file opens or, if the file is not of a common type, the user saves the file to disk prior to opening the file.

Similarly, as can be seen from FIG. 4, the user may wish to restore a file version from the back end data store 20, perhaps because the user accidentally overwrote the local file. To restore a version of a backed up file, from the browse backup screen 58 the user navigates to the file location (or enters the file name in the search field box 60), and clicks next to the file name 62. The server software displays all the file versions available, and the user selects the file version to restore. A dialog box 66 appears, providing the user with details on where to retrieve and download the restored file version.

Figure 6:
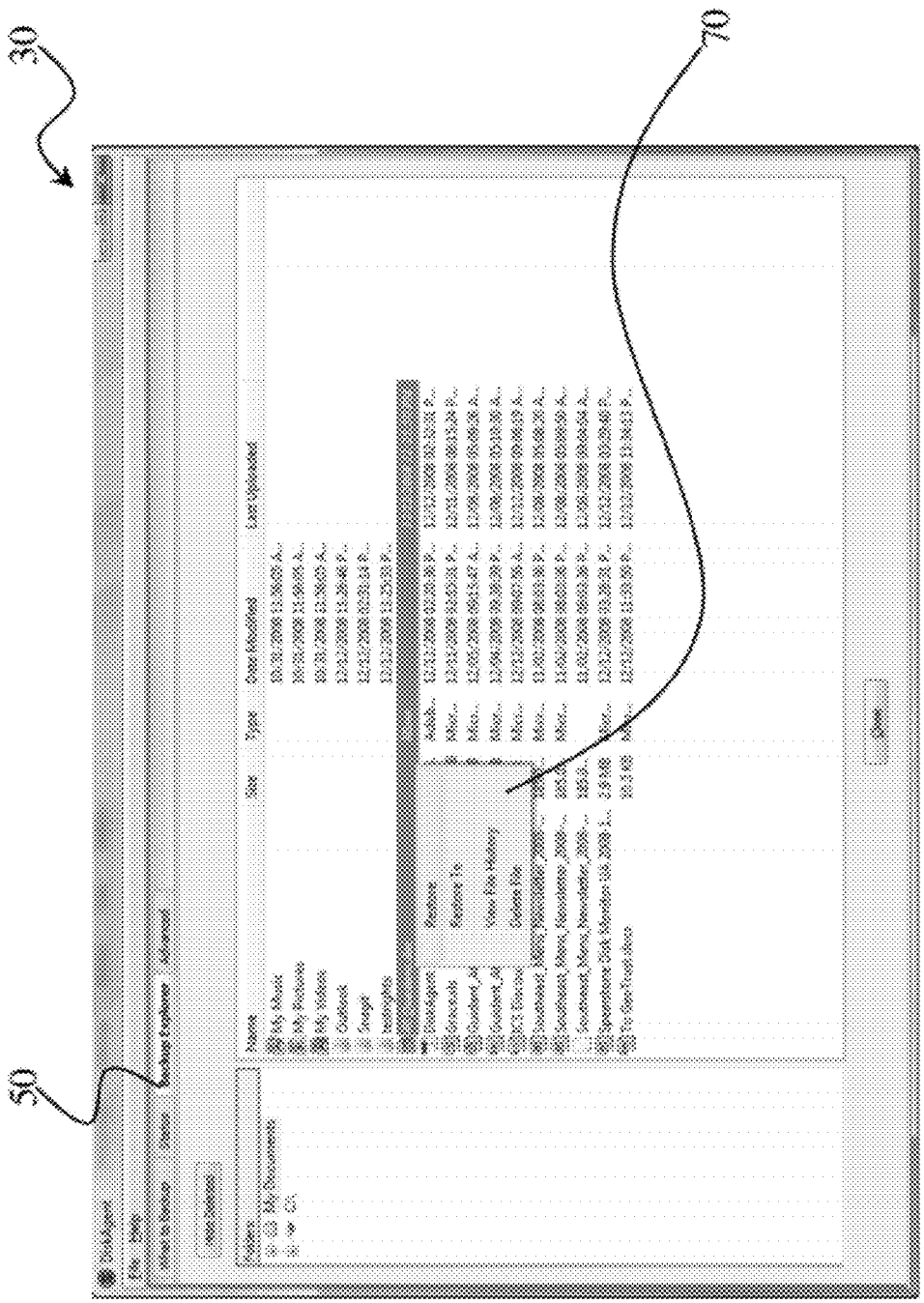
FIG. 6 depicts a third view of the backup explorer pane window of FIG. 3 according to one embodiment of the present method.

As depicted in FIG. 6, to restore a file to its original location, at the backup explorer pane 50, the user right clicks on a file name and selects restore in the drop-down restore dialog box 70. In this embodiment, once the file is restored the client activates a popup notification in the lower right hand corner of the computer screen that indicates that the file is being restored into the file's original location.

Similarly, a file may be restored to its original location from a web browser. As can be seen from FIG. 4, after logging on, the user navigates to the file location (or enters the file name in a search field box 60), and clicks next to the file name 62. The server software displays all the file versions available. The user selects the desired file version to restore. A dialog box 66 opens, detailing where the file is available for download. In a similar fashion, a file may be restored to a new location from a web browser.

Figure 7:
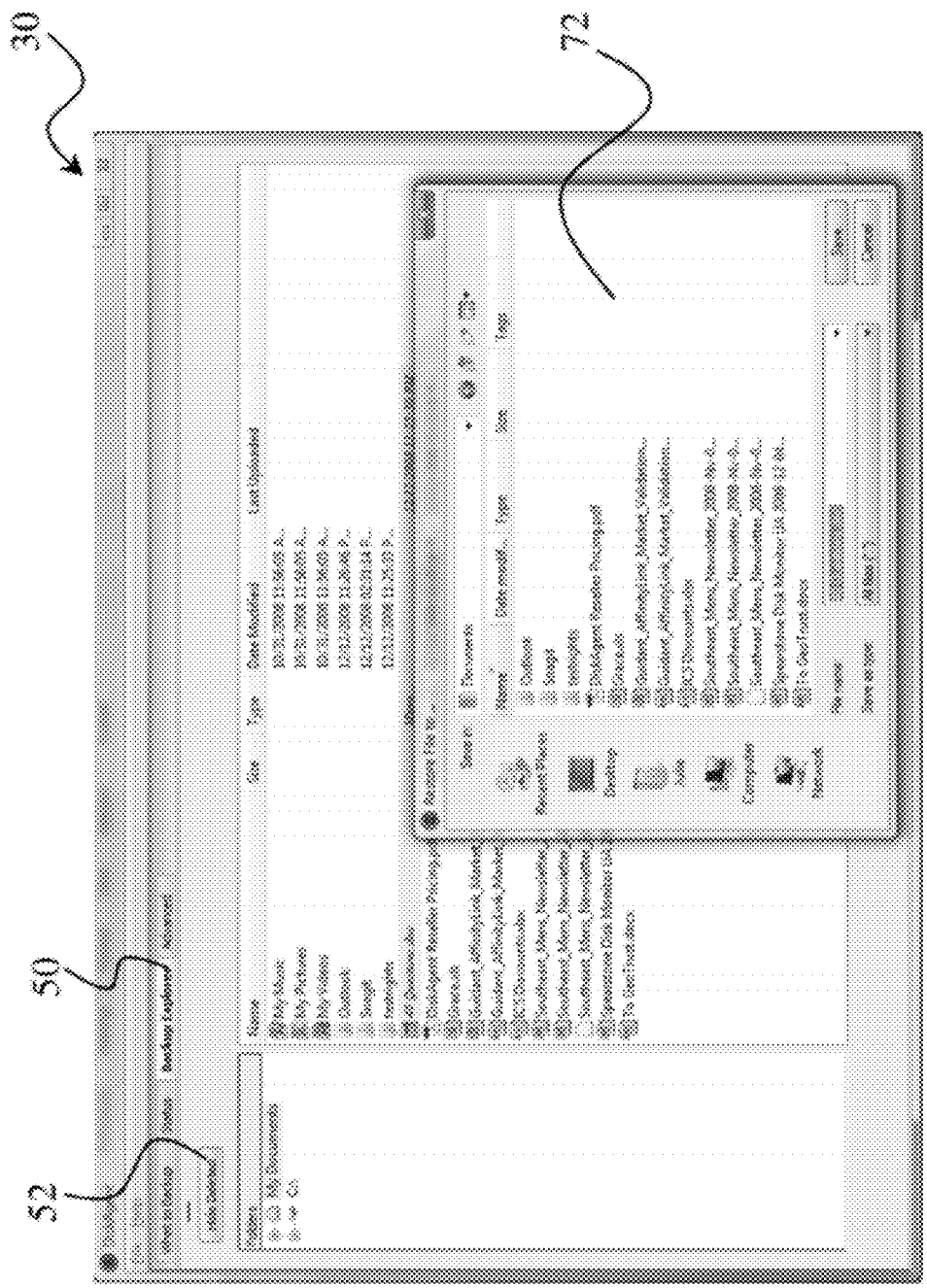
FIG. 7 depicts a fourth view of the backup explorer pane window of FIG. 3 according to one embodiment of the present method.

As depicted in FIG. 6, to restore a file to a new location, at the restore dialog box 70 the user selects restore to. As depicted in FIG. 7, an explorer dialog box 72 opens, and the user navigates to the desired restore location. In this embodiment, once the file is restored the client activates a popup notification in the lower right hand corner of the computer screen that indicates that the file is being restored into the file's original location.

Figure 8:
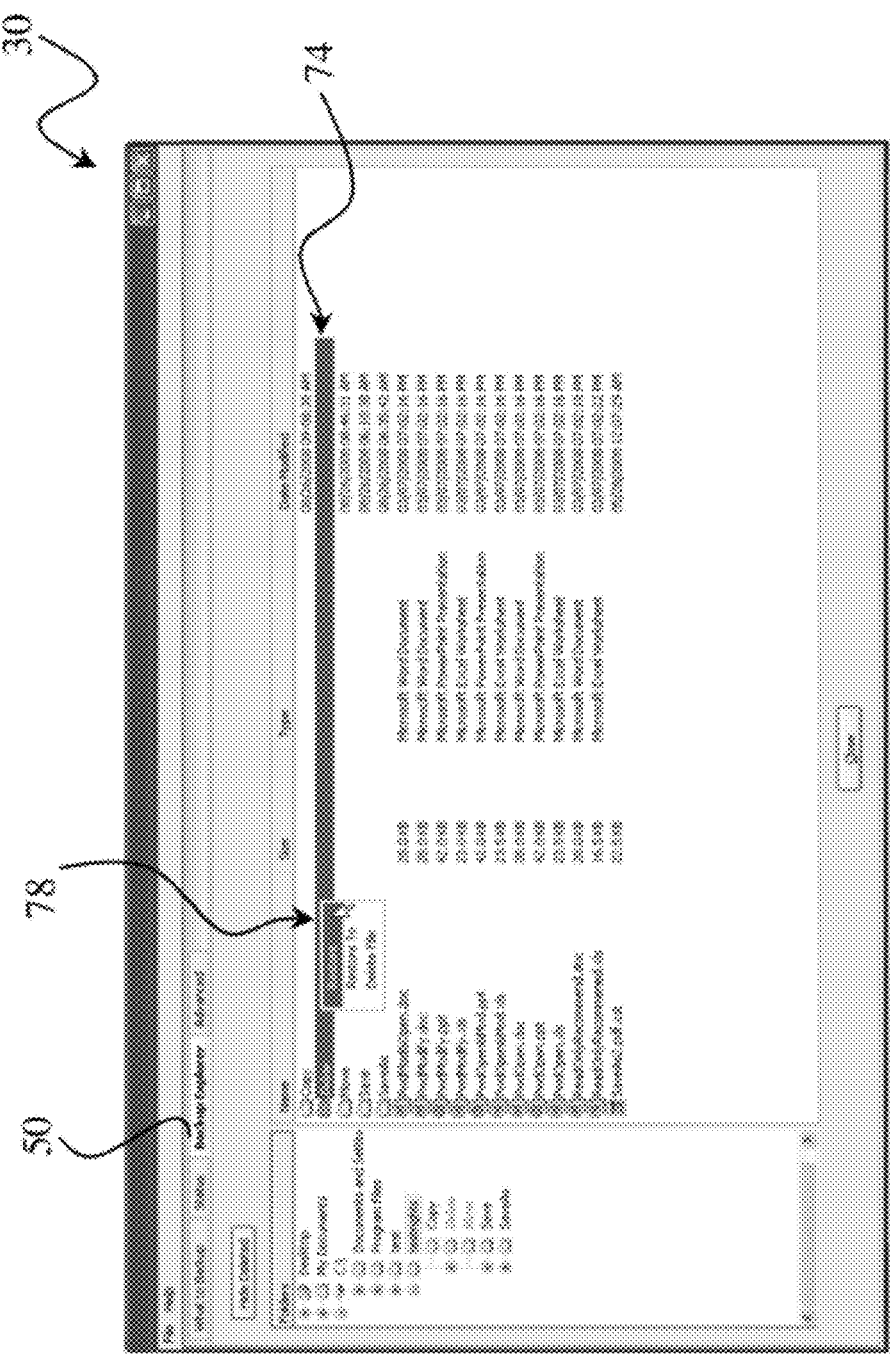
FIG. 8 depicts a fifth view of the backup explorer pane window of FIG. 3 according to one embodiment of the present method.

The present method also allows a user to restore an entire directory, either from the local computer or from the website. As depicted in FIG. 8, after navigating in the backup explorer pane 50 to the selected directory 74 and right-clicking, the user may restore a directory to its original location by selecting restore in the dialog box 78. Alternatively, the user may restore to a new location by selecting restore to. In either event, in this embodiment, once the directory is restored the software client activates a popup notification in the lower right hand corner of the computer screen that indicates that the directory is being restored to the selected location.

Figure 9:
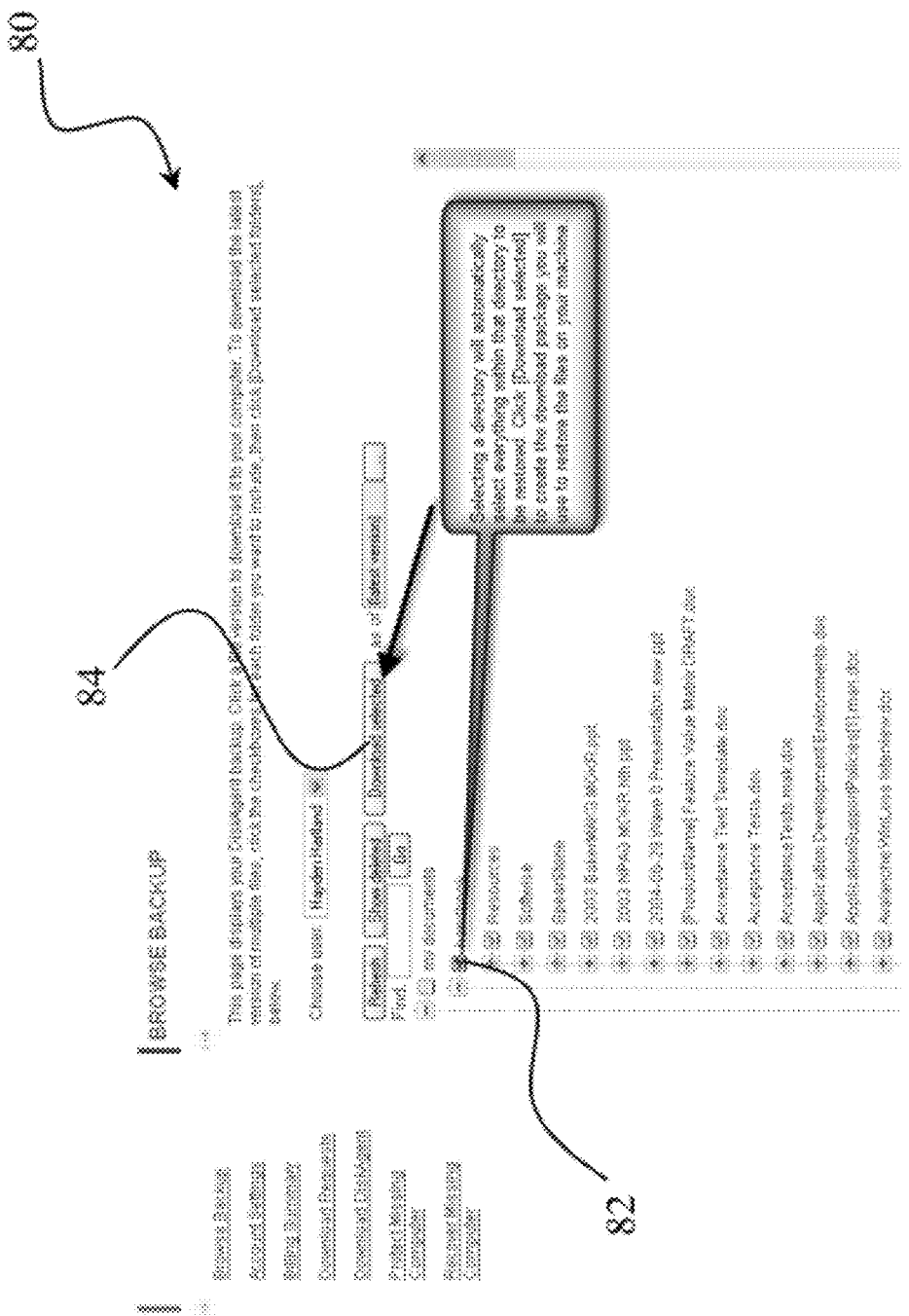
FIG. 9 depicts a second view of the view backup window according to one embodiment of the present method, but further including an explanatory balloon.

Similarly, a directory may be restored from a web browser. As depicted in FIG. 9, after logging on, the user navigates to a view backup window 80, checks the box 82 next to the desired directory, and then clicks the download selected box 84. The server software permits the user to select the directory for restoration, which is typically stored as a compressed .zip file. Again, the user may save the directory to its original location or to a new location.

Figure 10:
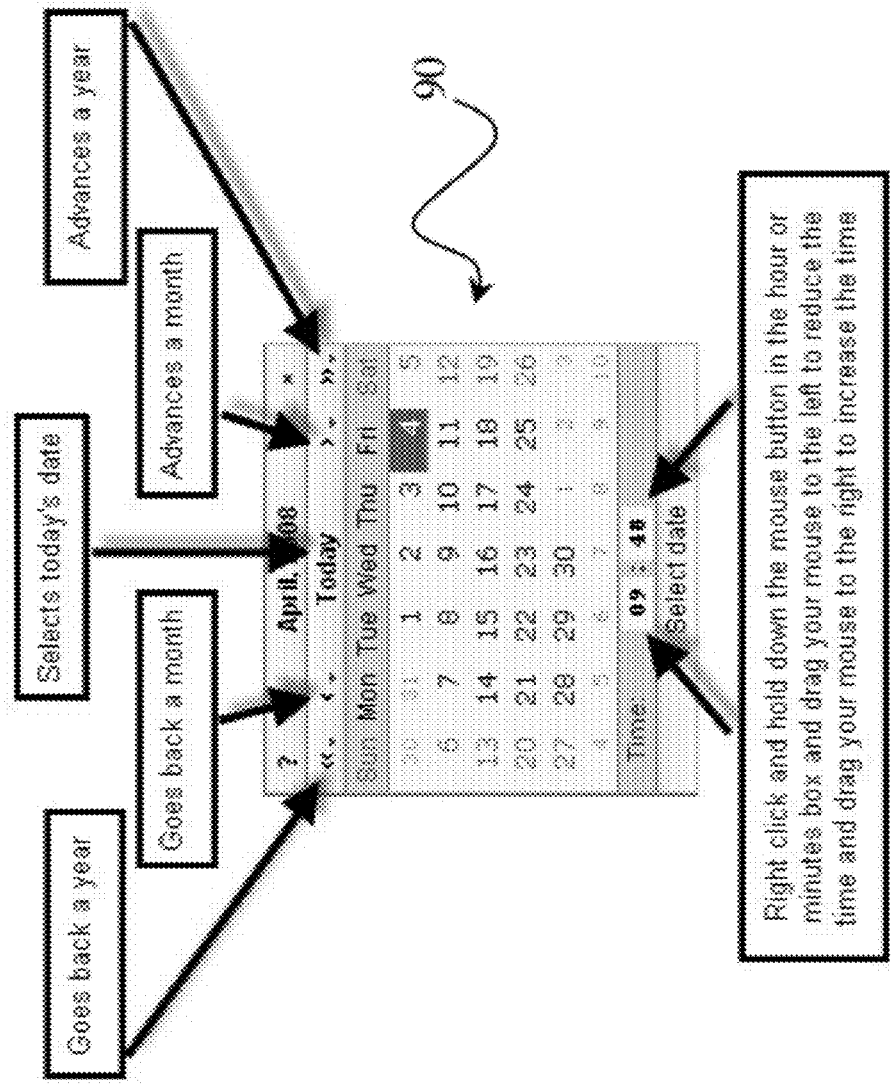
FIG. 10 depicts a calendar box window according to one embodiment of the present method, but further including a series of explanatory balloons.

The present method allows a user to restore a file or directory as of a certain date and time. As depicted in FIG. 10, after the user logs on to the website and selects the files or directories to be restored as of a specific data and time, the user is presented with a calendar box 90. The user navigates to the desired date and time using the buttons included in the calendar box. As is typical with calendar boxes of this sort, there are various buttons to assist in navigation, which buttons are also explained in FIG. 10.

Figure 11:
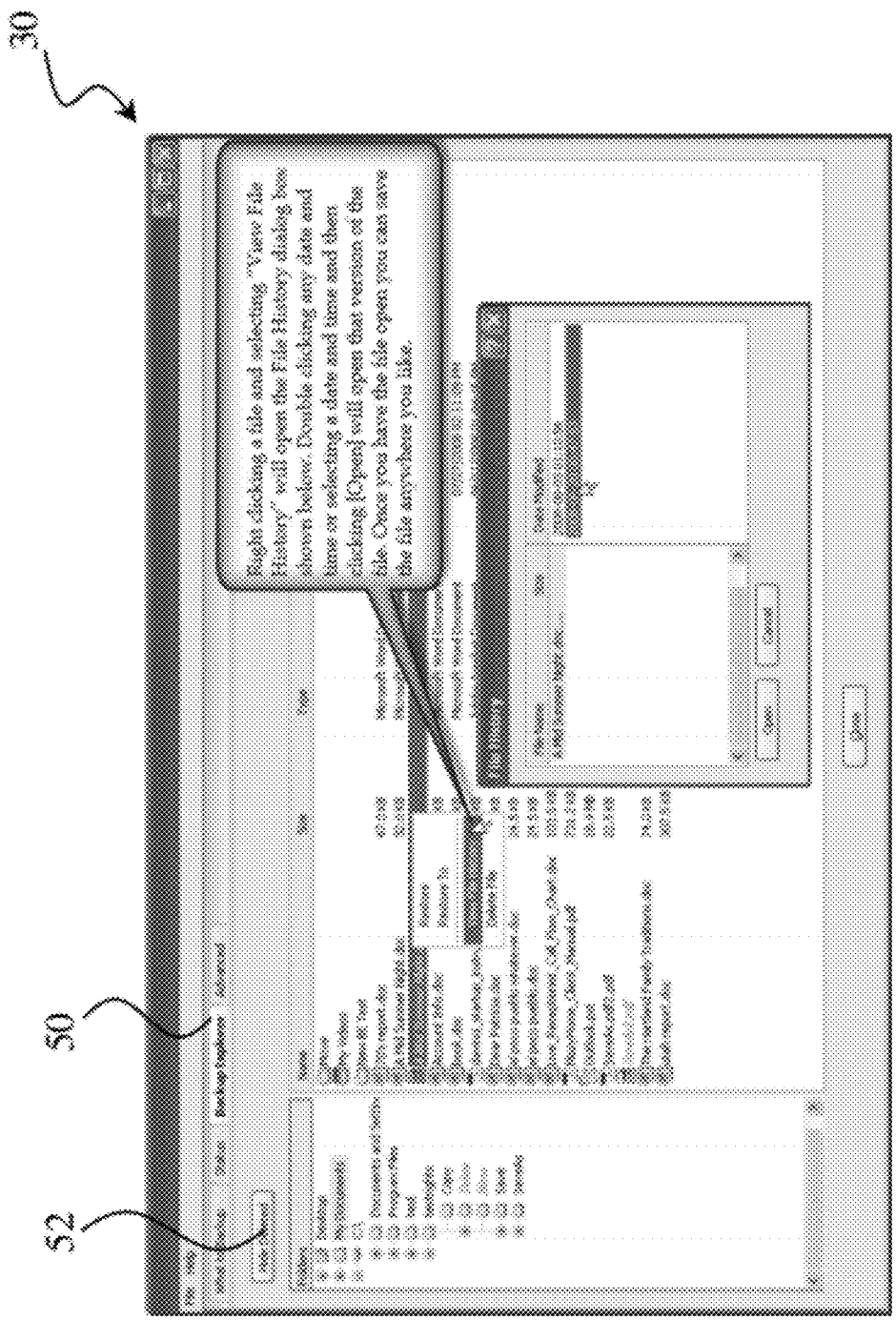
FIG. 11 depicts a fifth view of the backup explorer pane window of FIG. 3 according to one embodiment of the present method, but further including an explanatory balloon.

The present method also allows a user other options. For instance, as depicted in FIG. 11, by navigating from the backup explorer pane 50 to a file or directory, a user may right click to view the file history. To view deleted files and directories, the user clicks on the show/hide deleted toggle box 52.

Figure 12:
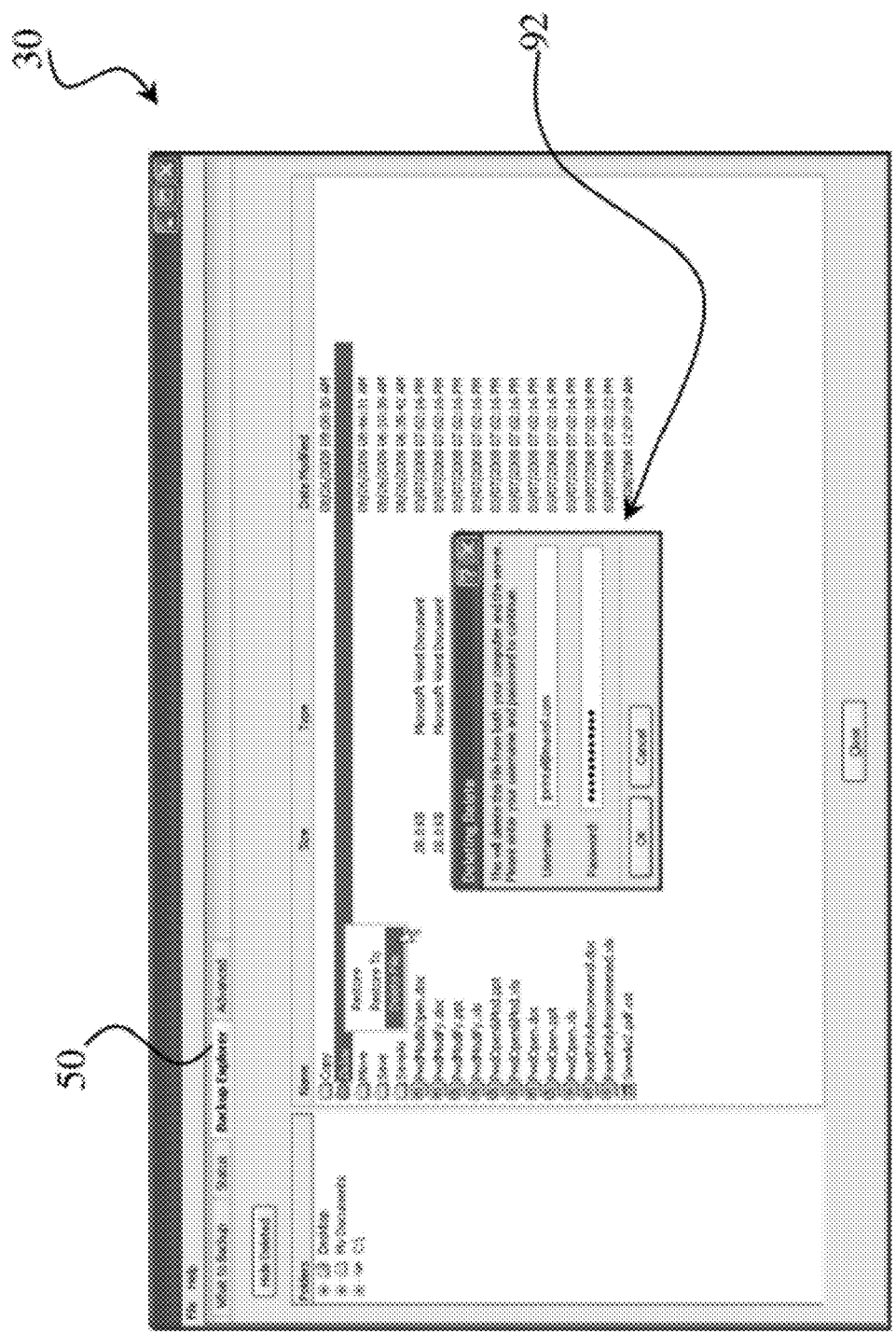
FIG. 12 depicts a sixth view of the backup explorer pane window of FIG. 3 according to one embodiment of the present method.

As depicted in FIG. 12, in this embodiment, to permanently delete a file or directory, from the backup explorer pane 50 the user navigates to and selects the file by right clicking and selecting delete file. In this embodiment, a delete box 92 opens, and the user is prompted to provide the user name and password to confirm the deletion, after which the file is no longer recoverable. In another embodiment of the present method, no confirmation is required.

Figure 13:
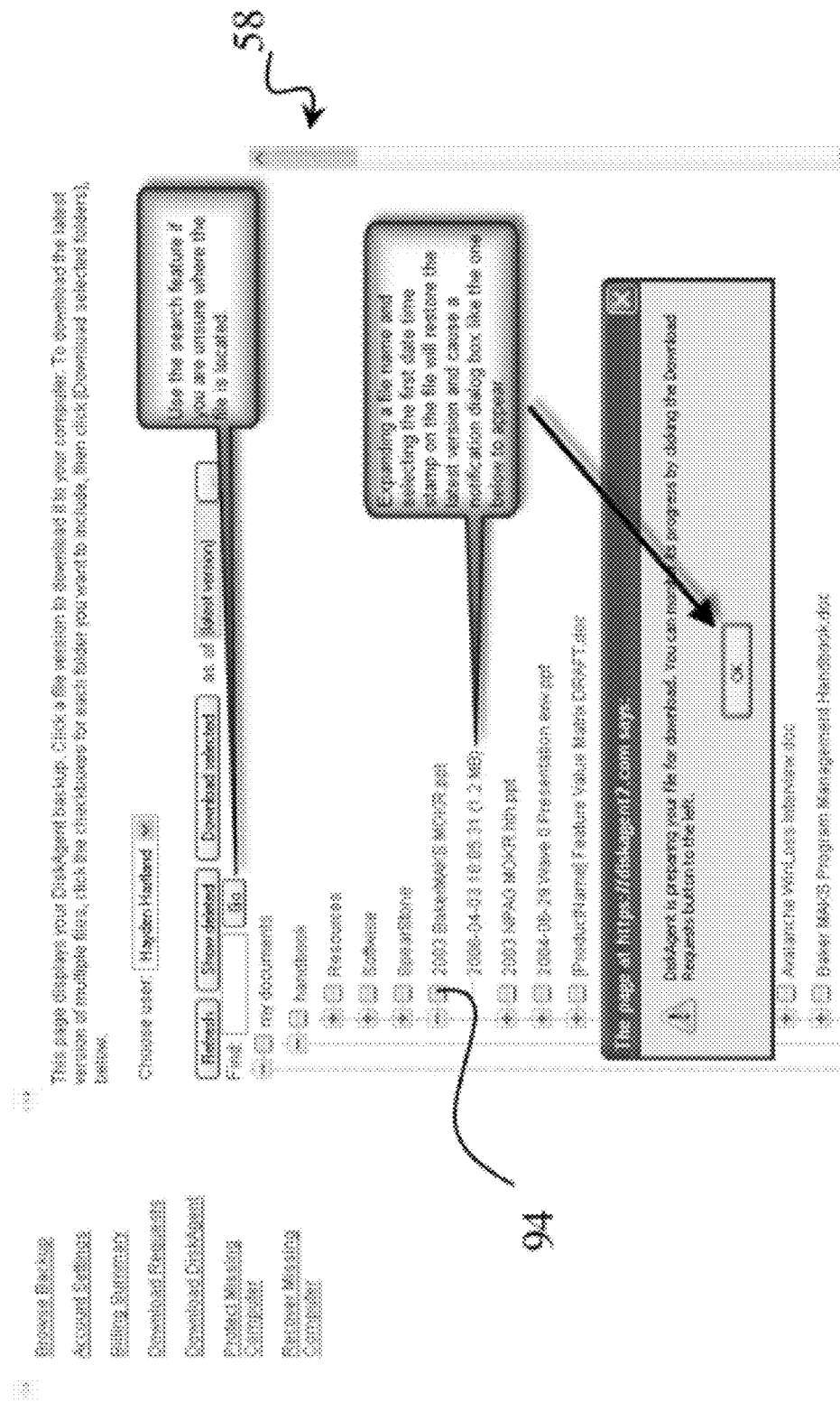
FIG. 13 depicts a third view of the view backup window according to one embodiment of the present method, but further including explanatory balloons.
Figure 14:
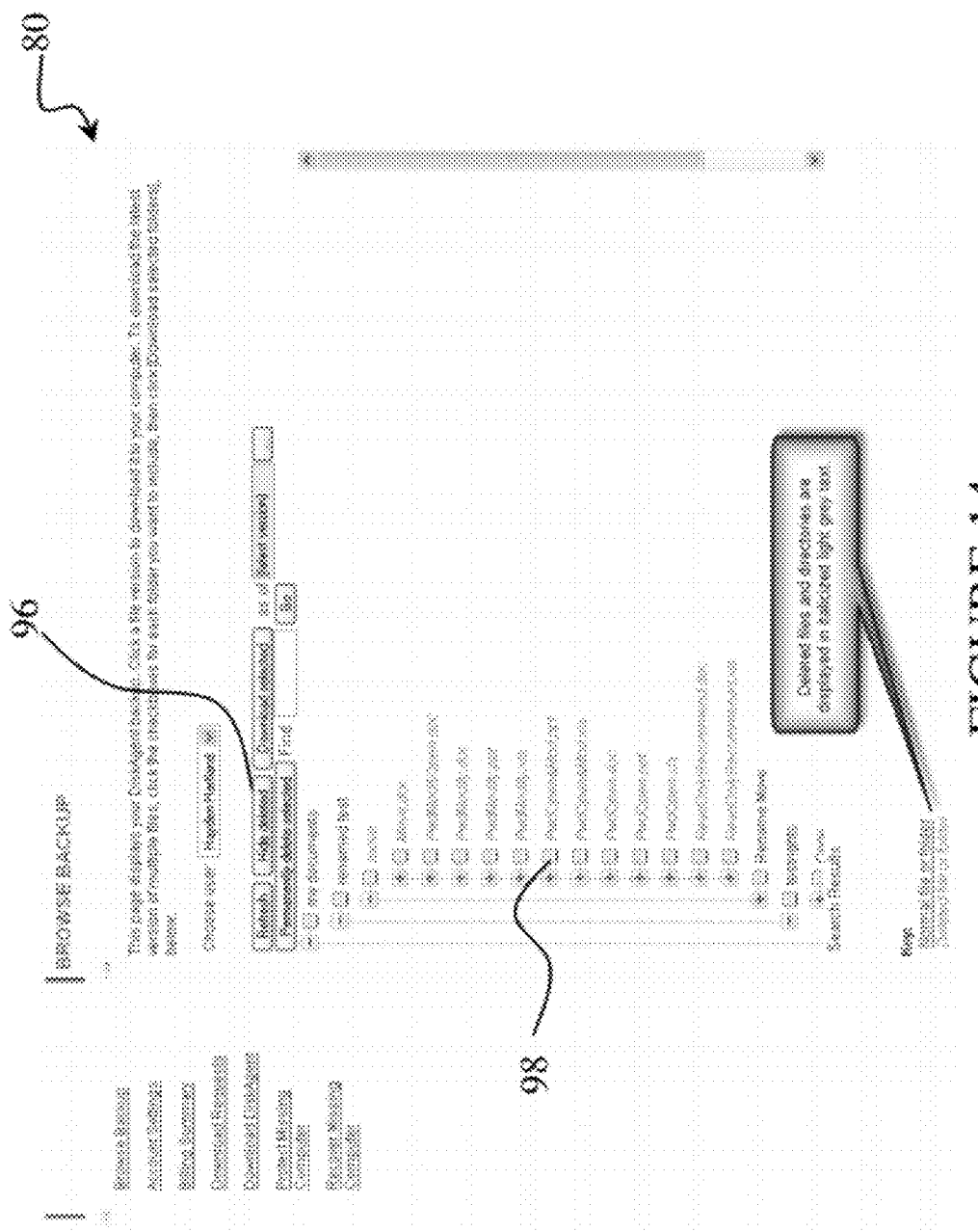
FIG. 14 depicts a fourth view of the view backup window of FIG. 9 according to one embodiment of the present method, but further including an explanatory balloon.
Figure 15:
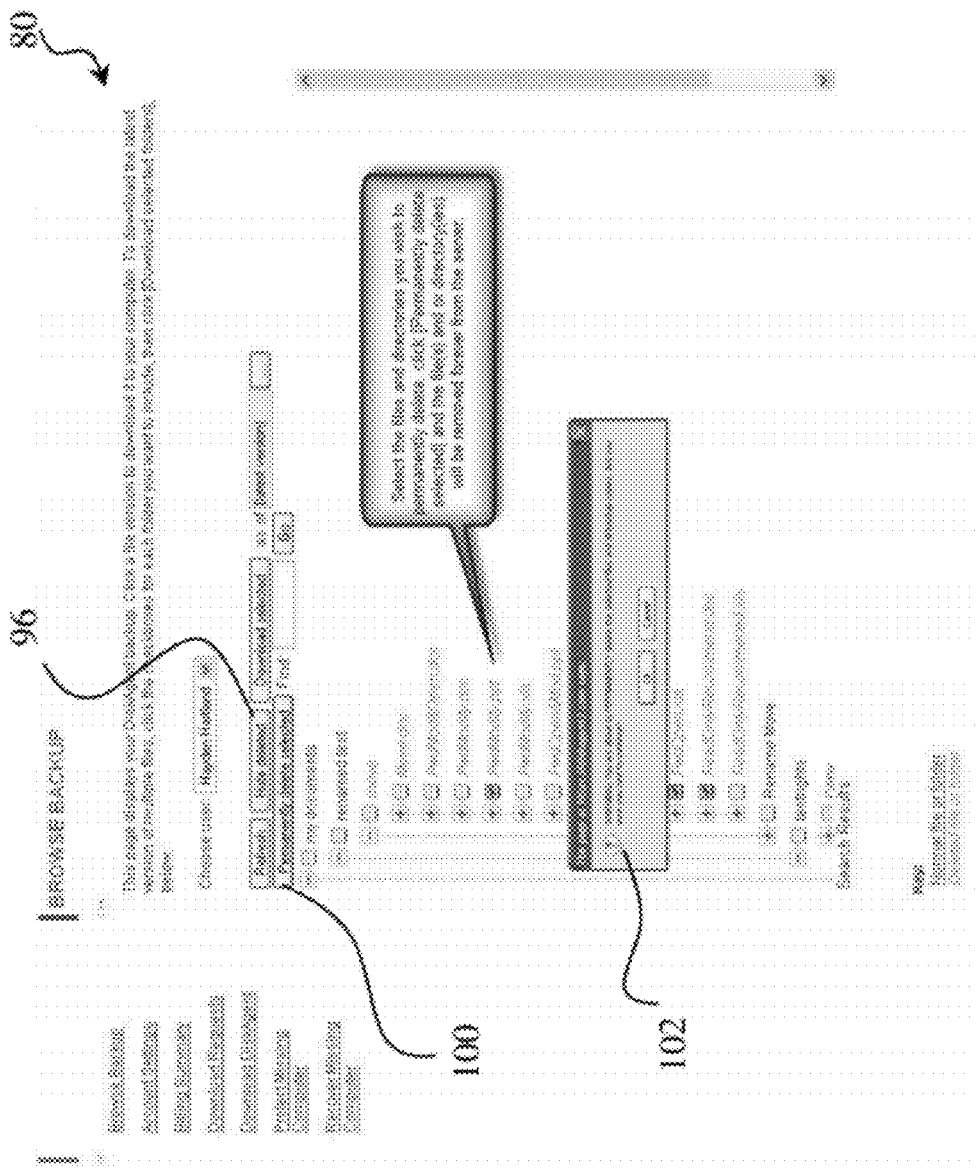
FIG. 15 depicts a fifth view of the view backup window of FIG. 9 according to one embodiment of the present method, but further including an explanatory balloon.

Similarly, a file history may be viewed, or deleted files viewed, or permanent deletions entered, from a web browser. As depicted in FIG. 13, after logging on, the user navigates to, and expands, the file history by clicking the +box 94 next to the desired file name, and the file versions will be displayed. As depicted in FIG. 14, after logging on, the user clicks the show/hide deleted toggle box 96, navigates to the deleted file to be viewed, and again expands the file listing by clicking on the +box 98 next to the file names to view deleted files. As depicted in FIG. 15, after logging on, the user clicks the show/hide deleted toggle box 96, navigates to the deleted file to be permanently deleted, selects the files or directories to be permanently deleted, and clicks the permanently delete selected box 100 and then a confirmation dialog box 102 and the files or directories will be permanently deleted from the backend data store 20.

Figure 16:
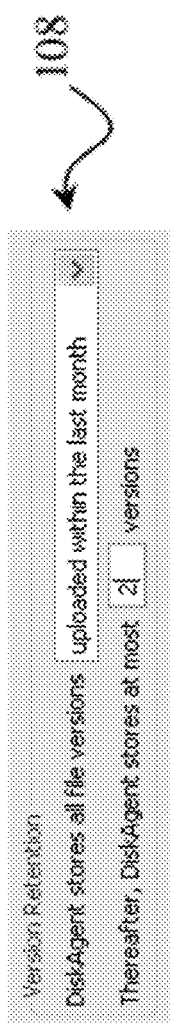
FIG. 16 depicts a version retention dialog box according to one embodiment of the present method.

In addition to these basic backup functions, the present method provides certain more advanced settings. For example, if the user clicks on the advanced tab 104 of the configuration dialog box 30, the user may can configure document retention settings. The document retention settings are used to specify at what point to cease retaining file history. For instance, a version retention dialog box 108, see FIG. 16, may open to provide options such as to retain all file versions within the last month, and thereafter to retain and store at most two versions, in which case the server software automatically deletes versions older than one month (30 days) but retains at least 2 file versions including deleted files. By selecting all file versions "forever" the method will safeguard every file change in history. One embodiment of the present method may also be configured to provide a notification if file changes cannot be backup up within a specified time.

According to one embodiment of the present invention, users may manage the effect of the present method on system performance. That is, a user may need to use the computer 10 to accomplish tasks while maintaining an appropriate safeguard for the information on the computer. This may lead to a balancing act between properly backing up that information in a timely fashion and reducing the effect of the backing up on computer performance. According to the present method, users may customize the level of resources used to ensure the information on the computer is properly safeguarded. For instance, if a user frequently changes certain files, such as databases or e-mail, the user may identify those files as frequently changing file types so that the client software does not upload every minor change made throughout the day. For instance, a user may limit the client software to specified CPU and Internet resource levels when the computer is otherwise in use.

Figure 17:
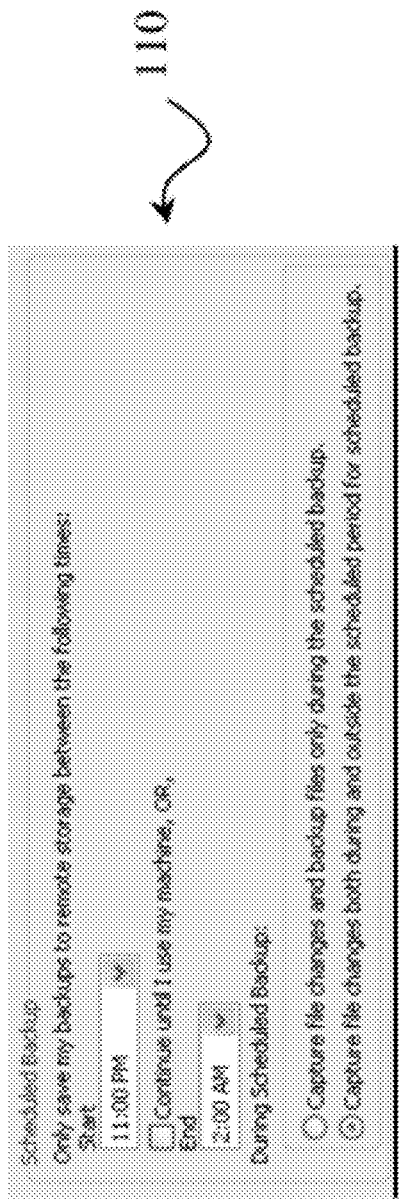
FIG. 17 a scheduled backup dialog box according to one embodiment of the present method.

According to one embodiment of the present method, a user may reduce or even eliminate Internet connectivity timing issues as well as resource allocation issues by establishing a backup schedule. The client permits the user to set start and end times for backups, and also permits retaining file changes and staging them for later upload so that the user may maintain file versions without connectivity. As depicted in FIG. 17, under the advanced tab 104 of the application main user interface 30, the user selects values in the scheduled backup dialog box 110. In that box, the user selects a start time and an end time. These times may be set to coincide times when the computer will be connected to the Internet but not in heavy use, for instance to reduce resource constraints. The user may also choose to capture file changes only during that scheduled backup time, or both during and outside the scheduled backup period.

Figure 19:
FIG. 19 depicts a "Suspend or Resume" pop-up dialog box according to one embodiment of the present method.

According to one embodiment, a user may manage frequently changing file types differently. For instance, certain file types, such as e-mail or point of sale files, do not necessarily need to be backed up with every single change. Thus, having those files backed up every time a change is made may overload or slow a computer or Internet connection. As depicted in FIG. 18, under the advanced tab 104 of the configuration dialog box 30, the user opens a frequently changing files dialog box 112. The user identifies the file types in the left box 114, and the frequency of backup in the right area 116, and the client manages the rest. Furthermore, the user may temporarily suspend the entire operation of the method by right clicking an icon in the system tray (lower right hand corner of the computer screen) and selecting "Suspend or Resume" as depicted in FIG. 19.

Figure 20:
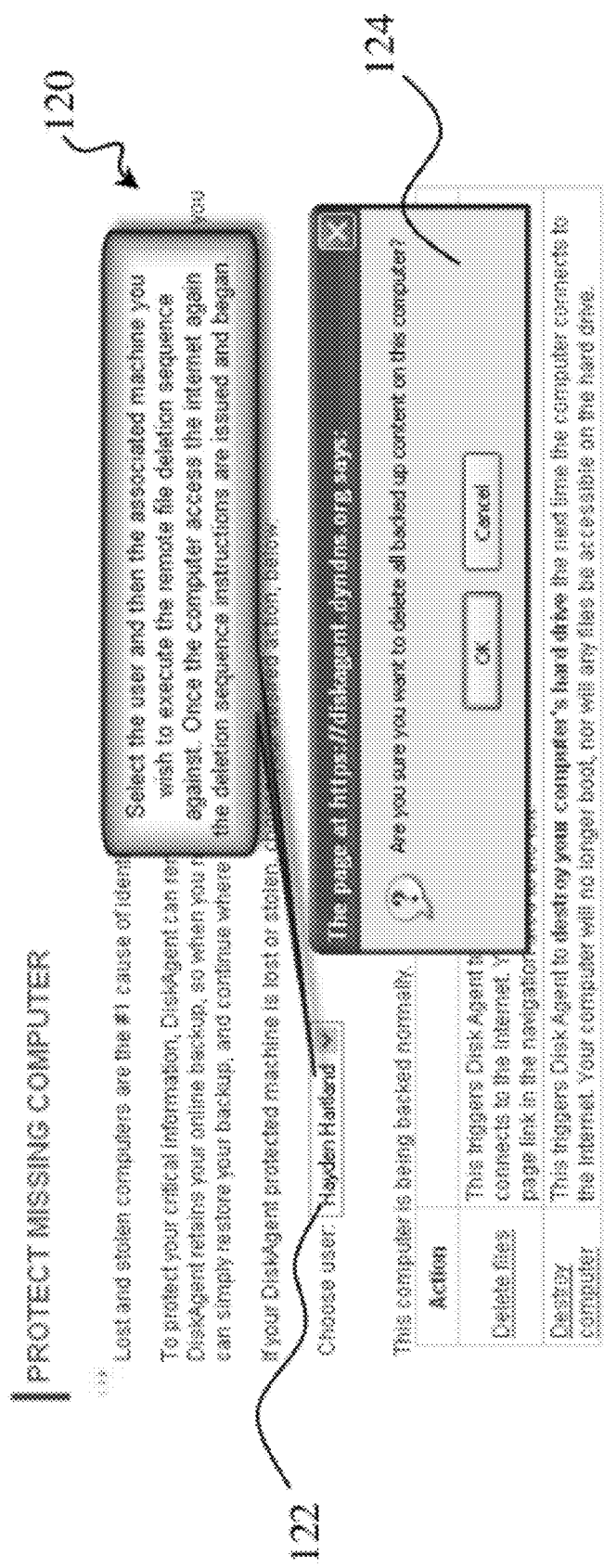
FIG. 20 depicts a protect missing computer page according to one embodiment of the present method, but further including an explanatory balloon.

One embodiment of the present method also includes various security features. For instance, if a user may to delete or destroy the files or even the entire file system of a stolen computer. As depicted in FIG. 20, the user logs on to the web site, and navigates to the protect missing computer page 120. After selecting the user name in the choose user box 122, the user may elect to delete files (which will delete all backed up files) or to destroy the computer, which will delete everything on the hard drive, rendering the computer inoperable until a new operating system is installed. A confirmation window 124 opens, and if confirmed, the next time that computer connects to the Internet, the server software identifies the machine (because the machine uploads the cached account information and IP address to the server) and will begin permanently deleting the elected content from that computer.

If the files delete option was selected, the user may check the status of the delete file sequence in an online backup set. If the destroy option is elected, the system typically will no longer be able to communicate with the computer, and thus no status report will be available. An additional option is to enable a dead man's switch; that is, if a computer or other device is not used for a certain defined period of time, once use commences, the user must enter a password within a defined time or the client will automatically delete the backed up files or even the entire hard drive.

One embodiment of the present method also includes a process for assisting in recovery of a computing device. After logging in, the user navigates to the recover missing computer page 130 and fills out the form. By coordinating with law enforcement, there is an opportunity to locate the computer if it is again connected to the Internet.

Management of the system of the present method is typically handled by a system administrator. As depicted in FIG. 22, to add a new user, the administrator logs on and navigates to an account settings page 134. After clicking the add user box 138 and entering the appropriate information (user name, e-mail, etc.) in a dialog box to create an account for the new user, the new user receives an explanatory email invitation and typically may install and configure the client on any computer or device they choose. The administrator may review which users have installed and configured the client as well as determine how many and which machines each user is backing up. The administrator is also typically granted the right to disable (or terminate) a user's ability to log in to the web site or use the client, but disabling typically will not delete content that has previously been backed up. An administrator also usually has the ability to re-set a user password or enable or disable loss protection.

Figure 23:
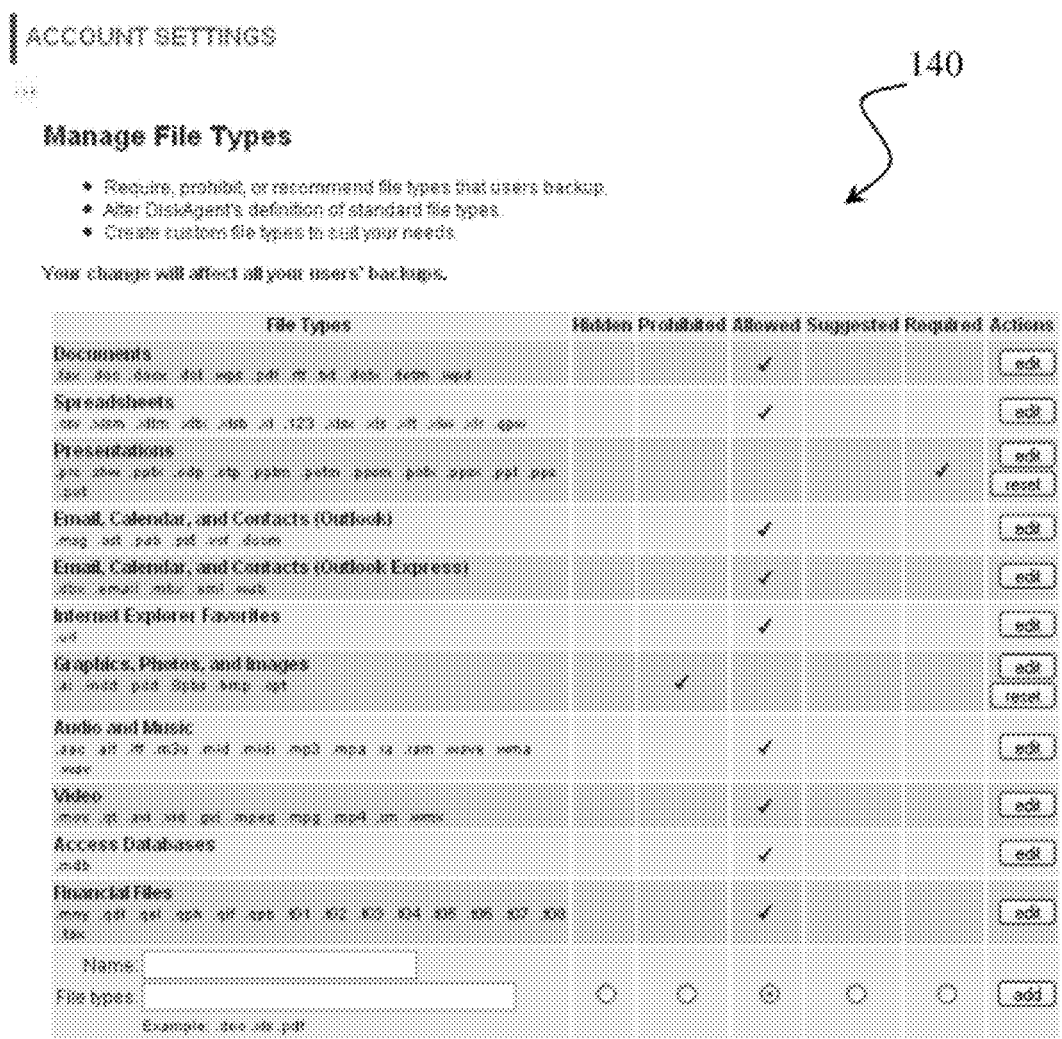
FIG. 23 depicts a manage file types page according to one embodiment of the present method.

An administrator may set specific other configuration settings, such as default file types or default directories. As depicted in FIG. 23, to configure default file types, the administrator logs on and navigates to an account settings page 140. On that page, the administrator may identify various file types and determine rules for handling those file types, such as prohibiting backup of certain file types, allowing others, and requiring yet others. For example, by setting a file type to required, all of those file types will be backed up for all managed users. The next time a user communicates by uploading, downloading, or logging in, the new rule will take effect. Similarly, as depicted in FIG. 23, the administrator may set defaults such as prohibited, required and permitted, for directories on a user's computer.

According to one embodiment of the present method, an administrator may also activate an e-mail capture feature. For example, certain regulations require that all e-mail from certain sources be properly archived. Often, a user may send an e-mail, then delete that e-mail from the user's sent folder and delete folder, thereby eliminating the e-mail from the records of the organization.

The present method overcomes this potential archival flaw. According to the present method, the administrator may configure e-mail capture by activating an executable on the e-mail server that captures each incoming and outgoing e-mail. The administrator also configures the client software to backup that directory. Once activated, an e-mail capture executable is installed on all e-mail servers. The capture feature automatically backs up (archives) every e-mail that sent or received by the e-mail server. Typically, the e-mail is indexed and thus searchable. As a result, should the authenticity of an e-mail be questioned, the administrator has the ability to check the archive.

The present method includes similar archival abilities for mobile phones on chat services, SMS, and MMS messaging. Again, typically, the messages are indexed and searchable. Not only will this permit a company to audit its own messaging services, the present method will also allow, for example, parents to audit text and instant messaging of their children (assuming proper authentication).

Figure 24:
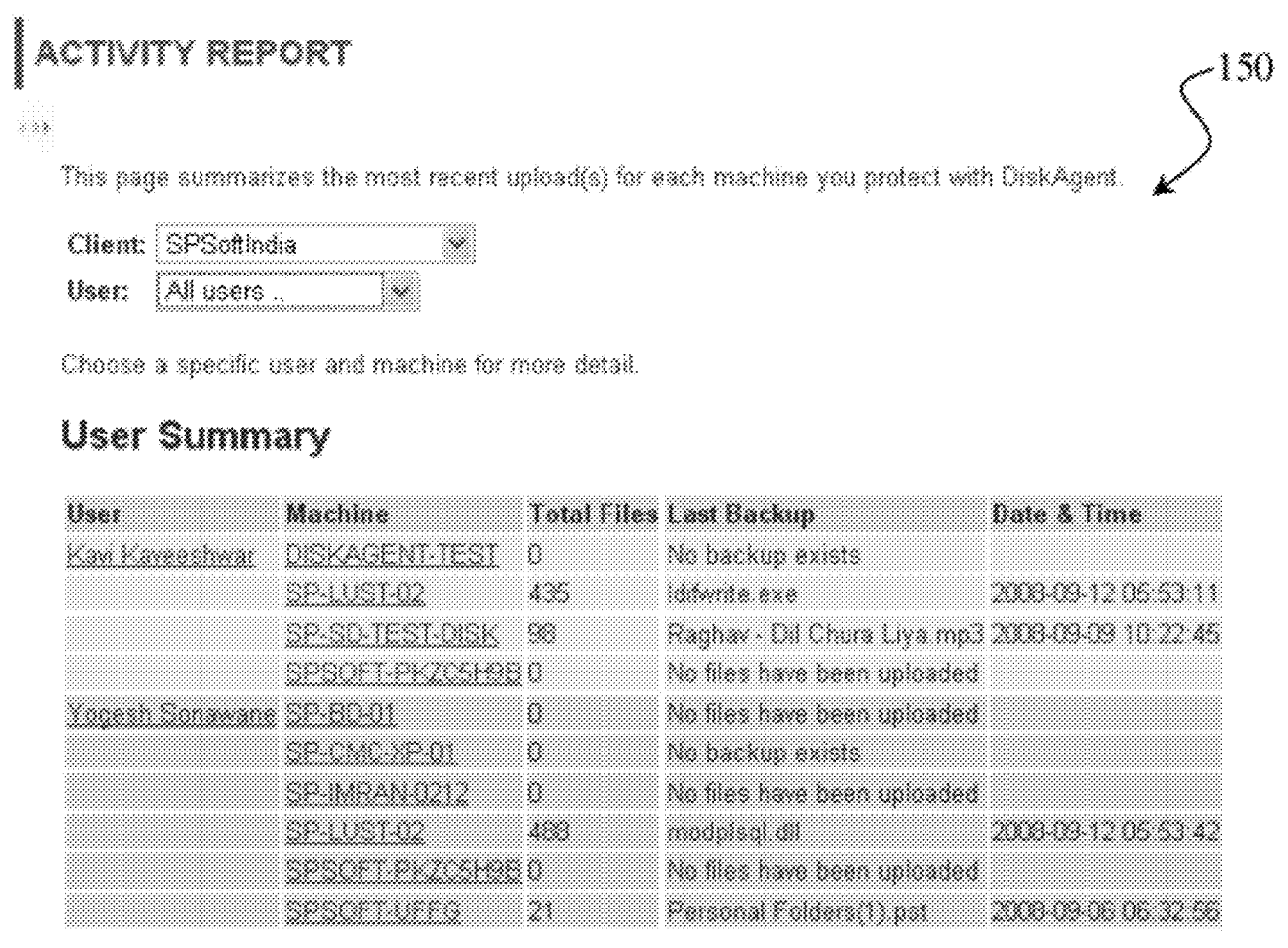
Figure 25:
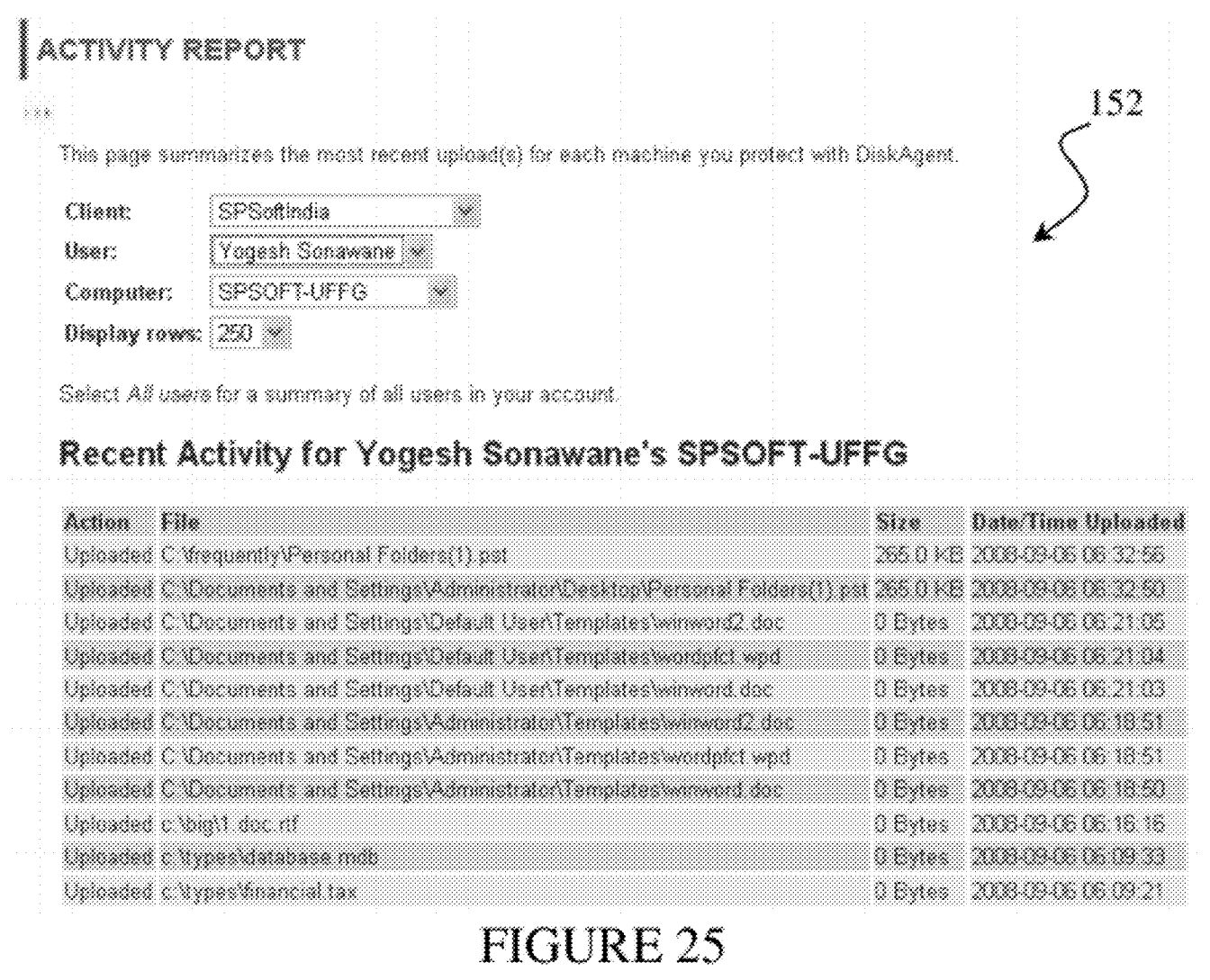

According to one embodiment of the present method, an administrator may monitor user activity. The administrator logs in, and navigates to an activity report page 150. As depicted in FIG. 24, on that page, the administrator may review activity by user. As depicted in FIG. 25, a detailed activity page 152 may also be generated.

Figure 26:
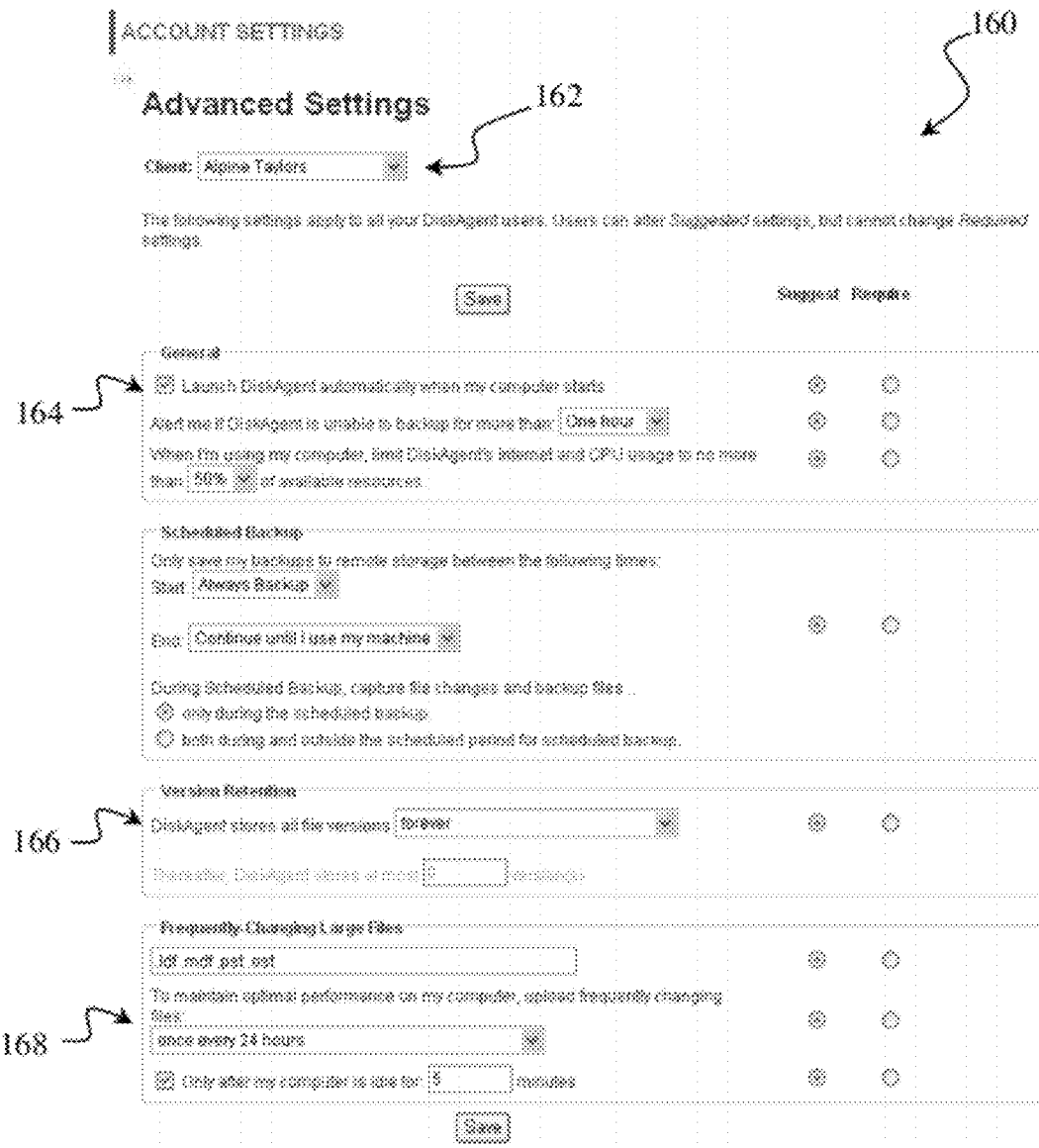
FIG. 26 depicts an exemplary advanced settings page according to one embodiment of the present method.

According to one embodiment of the present method, an administrator sets advanced policies by logging in, and navigating to an advanced settings page 160. As depicted in FIG. 26, on that page, the administrator typically may control every advanced tab setting of the client for all users using the website management functions. For example, the administrator may set the client parameters for an individual 162 for launching the client 164, version retention 166, frequently changing large files 168, or other parameters.

In some embodiments, the administrator is able to grant guest access accounts. Multiple users may be given rights to use the client software on the same device. Using an authentication system, such as the one that is included as part of the Microsoft Windows rights management, the client software may be configured to recognize which user is authenticated, and grant the rights the administrator allows for that user. The present method may also be configured to enable capturing, sending, and remote storage of device coordinates and proximity alerts when within user defined boundaries or conditions, using location determining methods known in the art.

Figure 27:
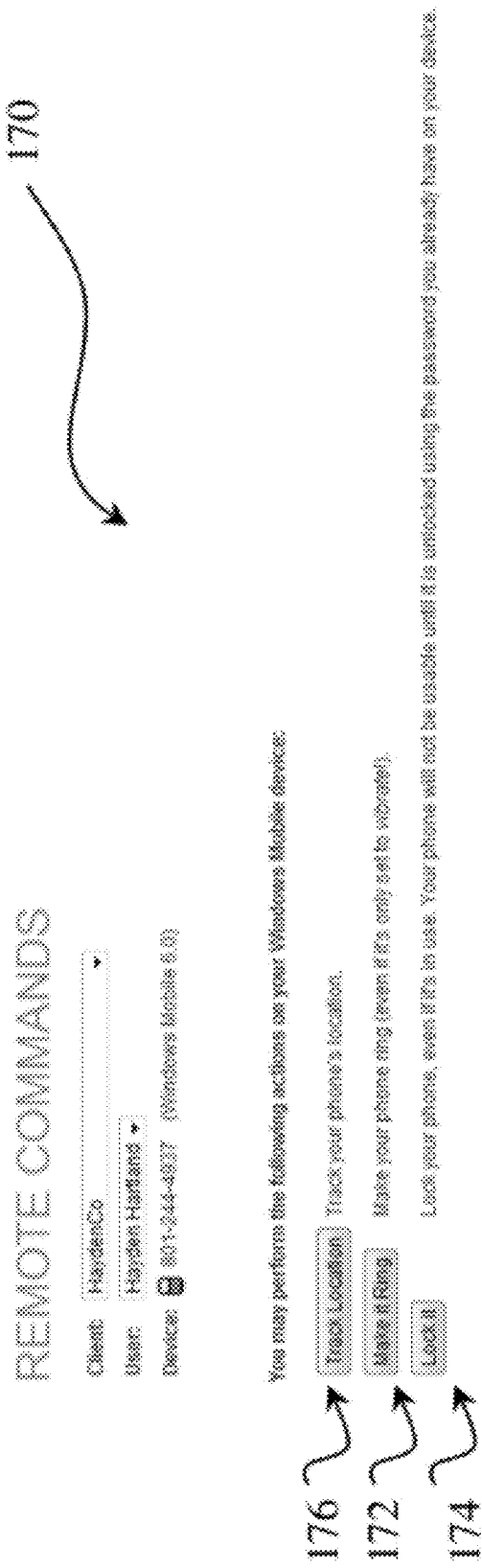
FIG. 27 depicts an exemplary remote commands page according to one embodiment of the present method.

The present method also allows users to install the client software on smart phones and PDAs to remotely locate or destroy a missing or stolen device. If the client software is installed on a mobile device, and the mobile device is lost or stolen, the user logs on to the secure website server. As depicted in FIG. 27, the user navigates to a remote commands page 170 from which the user may execute commands such as force a ring tone 172, lock the device with a password 174, or track the location of the device 176 (if the device is GPS enabled). Other commands may also be implemented, such as the ability to remove the operating system, reset the device, delete any data contained on the device and any attached memory cards, and render the device unusable until a new operating system is installed.

The present method also includes the ability to permit private labeling of the client software and even the entire method. That is, in one embodiment, the method is distributed under the brand of the manufacturer of the software or the back end server hosting company. In another embodiment, the provider of the client software contracts with another company to revise the brand notifications in the client software to refer to the other company. That other company then distributes the client software under terms and conditions acceptable to that company. However, the ultimate back end server hosting may still be provided by the original provider of the client software, but in a fashion that is opaque to the ultimate end user of the client software.

For example, according to this embodiment, a software distribution company such as a value-added reseller deploys the back-end data store application as part of the reseller's public internet address, while leaving a hosting company responsible for maintenance and management. The reseller creates a subdomain to its public Internet address, such as in the form of subdomain.resellercompany.com. The reseller configures the Domain Name System's A record to address this subdomain to an Internet Protocol address belonging to the hosting company.

To offer data and device protection and recovery services consistently with a reseller's corporate brand, the present method separates the software code that accesses end-user data from the features that control how that data is rendered to an end-user. This separation allows the hosting company to manage, maintain, and evolve the core software code and database, while allowing the reseller to maintain a small set of branding configurations. By adjusting these branding configurations, the reseller may completely alter the look, feel and branding of the service that end-users see.

In one embodiment, the reseller may specify various elements to configure the branding of the client software end-user install. These configurable elements might include the application name, to allow the reseller to define a product name for the data and device protection and recovery services they offered; a distinct logo, to allow the reseller to specify an identifying logo that appears in the sign-on and "About" screens of the client software; an icon, to allow the reseller to specify the icon through which the client software is identified and launched from within the computer operating system; a homepage URL, to allow the reseller to specify the public Internet address through which an end-user may reach the privately-labeled data and device protection and recovery service; support e-mail, to allow the reseller to specify the email address to which customer help requests are sent; and a separate end-user license agreement, to allow the reseller to define its own legal agreement customers must accept to use the data and device protection and recovery service.

In addition to branding the client software, according to one embodiment of the present method, the reseller may also brand the web application that provides end-users the ability to configure, manage, and access backup data over the Internet. In this embodiment, by entering declarations that conform to the Cascading Style Sheet specifications maintained by the World Wide Web Consortium (W3C), resellers may control the presentation of the web application, including elements such as colors, fonts, and layout. As examples, a fav icon implementation allows the reseller to specify an identifying icon that appears adjacent to the web browser address field, and adjacent to a "bookmarked" address saved in an end-user's browser. Homepage information allows the reseller to specify content in HTML that appears on the default page that appears when a user points a browser to the sub-domain the reseller assigned to its privately-labeled web application. Header information allows the reseller to specify hyperlinks or other HTML content chosen to appear identically on all pages of the privately-labeled web application (resellers commonly position header information atop their pages). Footer information allows the reseller to specify a second body of hyperlinks or other HTML content chosen to appear identically on all pages of the privately-labeled web application (resellers commonly position footer information at the bottom of their pages).

Typically, end-users own the data protected by the present data and device protection and recovery method. However, because end-users have different preferences for the degree of support they receive from a reseller, end-users differ in the degree of access they want to provide the reseller to configure, manage, and access data protected by such a service. To allow the reseller to accommodate these different preferences, one embodiment of the present method allows the end-user to configure the level of access their reseller has.

The end user may allow or disallow the reseller certain capabilities. As examples, under a configure service, the reseller may manage the folder and file types that are required, optional, or prohibited for the end-user's organization, and may change the Advanced Settings that apply to all the end-user organization's users. A manage users and privileges capability might permit the reseller to add and remove users, and change user privileges. A view filenames and help restore capability would permit the reseller to view and navigate the backup hierarchy, and select files to be restored. However, the reseller might be prevented from opening a restore package, downloading a file, or accessing any file contents. Under an open access backup files service, the reseller may open a restore package and download files from the end-user's backup. Similarly, a delete data from backup capability would permit the reseller to permanently delete files from the end-user's backup.

To support the differing pricing preferences of its customers, the present method contemplates allowing a reseller to create and assign different pricing models for the data and device protection and recovery services. Each customer is assigned one pricing model. In this way, the reseller may simultaneously provide data and device protection and recovery services at different pricing rates to different end-user customers. Along those lines, the Reseller may define such things as: a promo code for each pricing model, so that customers who enter the promo code at signup are assigned the associated price model; a default price model, so that customers who sign up with no promo code get the default price model; a last signup date on which a customer can sign up for a price model; a one-time up-front signup fee that is charge applied when a new customer begins service; a recurring monthly flat fee (per machine), regardless of backup quantity; a per gigabyte (or other measure) fee, under which the customer is charged for backup storage, per GB (over and above any free storage), based on a monthly storage high-point; a storage amount included free of charge, perhaps measured by machine; a remote wipe fee that is applied on a per-computer basis for remote wipe features; a phone fee that is applied on a per-phone basis for use of the present method on smart phones; various different billing cycles; various different types of conversion pricing models to be applied after, for example, completion of certain milestones such as length of time; a title script for the initial customer sign-up; and even an actions setting that requires that until a price model has subscribers, the price model may be deleted by the reseller, but once there are customers under that pricing model, the reseller may only hide or edit the model, so that existing customers have the benefits of being grandfathered into that model.

The present method allows a user more effectively to maintain secure backups, and to manage a wide variety of aspects of that backup process from a wide variety of devices and in a wide variety of ways. Thus, the present method has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A method of easily-accessible, versioned, secure, redundant backup of digital information, comprising the steps of:
    establishing a first readily expandable redundant back-end data store having a fault tolerant connection to a communications network, the first data store being configured for remote management by a user;
    enabling bi-directional communication over the communications network between the first data store and a computing device;
    provisioning the computing device with a client application capable of executing an algorithm on the computing device, the client application having the capabilities of:
    communicating with the first data store;
    monitoring a second data store that is accessible by the computing device;
    detecting and replicating changes in the second data store including detection of differences in versions of data in the second data store and detection of deletions of versions of data;
    selecting a first set of predetermined data in the second data store to be monitored by the client application and selecting at least a portion of the first set of predetermined data to be transmitted over the communications network to the first data store;
    selecting predetermined data in the first data store to be transmitted over the communications network to the second data store, including pushing data from the first data store to the second data store using a remote access protocol;
    establishing policies for the data backup and transmission, including requirements for data to be transmitted to and from the first data store, data not to be transmitted to or from the first data store, requirements for data to be deleted from, or retained on, the first or second data store, and allocation of network bandwidth and CPU cycles;

monitoring the status of data backup and providing a risk assessment of the data backup based on predetermined criteria;

browsing the first data store;

restoring data from the first data store to the second data store;

reviewing prior versions of data stored on the first data store based on a predetermined criteria;

managing access to the computing device upon occurrence of a triggering event;

being remotely updated;

causing data on the second data store to be deleted when the operating system is started unless a user properly authenticates to the client application;

setting backup criteria, including location, naming conventions, file types, frequently changing files backup criteria, size limits, bandwidth requirements and limitations, and identification of file groups, members of which require synchronous backup;

enabling the capturing, sending, and remote storage of device coordinates and proximity alerts when within user defined boundaries or conditions;

setting restoration criteria;

handling alerts regarding the backup of data to the first data store; and staging changes to data in the second data store during offline use for backup to the first data store upon connection to the communications network;

causing the client application to generate and send a file hash to the first data store, searching the first data store for a matching file hash for files already stored in the first data store; and if a match is found, saving a file pointer reference for any data store that subsequently attempts to save a file from which an identical file hash is obtained; and enabling web access to the first data store.

2. The method of claim 1 further comprising the step of providing a web client that can configure aspects of the first data store and manage rights and access to the first data store and the second data store.

3. The method of claim 1 further comprising the step of providing an engine that rebrands the client application to allow third party value added resellers to distribute the client application under a brand controlled by the third party.

4. The method of claim 1 wherein the triggering event includes notification from a user or an administrator, repeated unsuccessful access attempts, or a predetermined length of time passing between uses of the client application.

5. The method of claim 1 further comprising the step of enabling capture of electronic messages and attachments for transmission to and storage in the first data store.

6. The method of claim 1 further comprising the step of enabling the capturing, searching, and indexing of SMS, MMS, and other handheld communication protocols for review by an authorized user.

7. The method of claim 1 further comprising the step of identifying a set of privilege levels for users.

8. The method of claim 1 further comprising the step of safeguarding digital information by triggering a deletion of said data, or deleting the second data store upon occurrence of a triggering event.

9. The method of claim 1 wherein the data being transmitted between the first and second data store is encrypted and compressed prior to transmission.

10. A system for backup of digital information, comprising the steps of:

establishing a first data store having a connection to a communications network;

enabling communication over the communications network between the first data store and a computing device;

provisioning the computing device with a client application having the capabilities of:

communicating with the first data store;

monitoring a second data store;

detecting and replicating differences in versions of data in the second data store and detection of deletions of versions of data;

selecting a first set of predetermined data in the second data store to be monitored by the client application;

causing data on the second data store to be deleted when the operating system is started unless a user properly authenticates to the client application;

establishing policies for the data backup and transmission;

enabling the capturing, sending, and remote storage of device coordinates and proximity alerts when within user defined boundaries or conditions;

causing the client application to generate and send a file hash to the first data store;

searching the first data store for a matching file hash for files already stored in the first data store; and if a match is found, saving a file pointer reference for any data store that subsequently attempts to save a file from which an identical file hash is obtained;

monitoring the status of data backup;

restoring data from the first data store to the second data store; and managing access to the computing device upon occurrence of a triggering event; and enabling web access to the first data store.

11. The system of claim 10 further comprising the step of providing a web client that can configure aspects of the first data store and manage rights and access to the first data store and the second data store.

12. The system of claim 10 further comprising the step of providing an engine that rebrands the client application to allow third party value added resellers to distribute the client application under a brand controlled by the third party.

13. The system of claim 10 further comprising the step of enabling capture of electronic messages and attachments for transmission to and storage in the first data store.

14. The system of claim 10 further comprising the step of enabling the capturing, searching, and indexing of SMS, MMS, and other handheld communication protocols for review by an authorized user.

15. The system of claim 10 further comprising the step of identifying a set of privilege levels for users.

16. The system of claim 10 further comprising the step of safeguarding digital information by triggering a deletion of said data, or deleting the second data store upon occurrence of a triggering event.

17. The system of claim 10 wherein the data being transmitted between the first and second data store is encrypted and compressed prior to transmission.

18. The system of claim 10 wherein the first data store is configured for remote management by a user.

19. The system of claim 10 further comprising the step of selecting at least a portion of the first set of predetermined data to be transmitted over the communications network to the first data store.

20. The system of claim 10 further comprising the step of selecting predetermined data in the first data store to be transmitted over the communications network to the second data store.

21. The system of claim 10 further comprising the step of providing a risk assessment of the data backup based on predetermined criteria.

22. The system of claim 10 further comprising the step of browsing the first data store.

23. The system of claim 10 further comprising the step of reviewing prior versions of data stored on the first data store based on a predetermined criteria.

24. The system of claim 10 further comprising the step of setting restoration criteria.

25. The system of claim 10 further comprising the step of handling alerts regarding the backup of data to the first data store.

26. The system of claim 10 further comprising the step of staging changes to data in the second data store during offline use for backup to the first data store upon connection to the communications network.

27. The system of claim 10 wherein the triggering event includes notification from a user or an administrator, repeated unsuccessful access attempts, or a predetermined length of time passing between uses of the client application.

28. A non-transitory computer-readable media for storing and executing instructions to backup digital information, comprising the step of enabling a first data store to communicate with a computing device, the computing device being capable of detecting and replicating differences in versions of data in the first data store and a second data store and of restoring predetermined data from the first data store to the second data store, and further comprising the steps of:
   communicating with the first data store;
   monitoring the second data store;
   detecting and replicating differences in versions of data in the second data store and detection of deletions of versions of data;
   selecting a first set of predetermined data in the second data store to be monitored by the client application;
   causing data on the second data store to be deleted when the computing device is started unless a user properly authenticates to the computing device;
   establishing policies for the data backup and transmission;
   enabling the capturing, sending, and remote storage of device coordinates and proximity alerts when within user defined boundaries or conditions;
   causing the computing device to generate and send a file hash to the first data store;
   searching the first data store for a matching file hash for files already stored in the first data store; and
   if a match is found, saving a file pointer reference for any data store that subsequently attempts to save a file from which an identical file hash is obtained;
   monitoring the status of data backup;
   restoring data from the first data store to the second data store;
   managing access to the computing device upon occurrence of a triggering event; and
   enabling web access to the first data store.

29. The non-transitory computer-readable media of claim 28 further comprising the step of enabling web access to the first data store.

30. The non-transitory computer-readable media of claim 28 wherein the first data store and the computing device communicate over a communications network.

31. The non-transitory computer-readable media of claim 28 further comprising the step of establishing policies for the data backup and transmission.

32. The non-transitory computer-readable media of claim 28 further comprising the step of managing access to the computing device upon occurrence of a triggering event.

33. The non-transitory computer-readable media of claim 28 further comprising the step of providing a web client that can configure aspects of the first data store and manage rights and access to the first data store and the second data store.

34. The non-transitory computer-readable media of claim 28 further comprising the step of providing an engine that rebrands the method to allow third party value added resellers to distribute the method under a brand controlled by the third party.

35. The non-transitory computer-readable media of claim 28 further comprising the step of enabling capture of electronic messages and attachments for transmission to and storage in the first data store.

36. The non-transitory computer-readable media of claim 28 further comprising the step of enabling the capturing, searching, and indexing of SMS, MMS, and other handheld communication protocols for review by an authorized user.

37. The non-transitory computer-readable media of claim 28 further comprising the step of identifying a set of privilege levels for users.

38. The non-transitory computer-readable media of claim 28 further comprising the step of safeguarding digital information by triggering a deletion of said data, or deleting the second data store upon occurrence of a triggering event.

39. The non-transitory computer-readable media of claim 28 wherein the first data store being configured for remote management by a user.

40. The non-transitory computer-readable media of claim 28 further comprising the step of setting restoration criteria.

41. The non-transitory computer-readable media of claim 28 further comprising the step of staging changes to data in the second data store during offline use for backup to the first data store upon establishing a connection between the first data store and the computing device.

42. The non-transitory computer-readable media of claim 32 wherein the triggering event includes notification from a user or an administrator, repeated unsuccessful access attempts, or a predetermined length of time passing between uses of the client application.

* * * * *